United States Patent
Ciabarra, Jr. et al.

(10) Patent No.: US 12,430,391 B2
(45) Date of Patent: Sep. 30, 2025

(54) TEMPLATE BUILDER AND USE FOR NETWORK ANALYSIS

(71) Applicant: Quantum Metric, Inc., Colorado Springs, CO (US)

(72) Inventors: Mario Luciano Ciabarra, Jr., Colorado Springs, CO (US); Adam Dille, Monument, CO (US)

(73) Assignee: Quantum Metric, Inc., Colorado Springs, CO (US)

( * ) Notice: Subject to any disclaimer, the term of this patent is extended or adjusted under 35 U.S.C. 154(b) by 212 days.

(21) Appl. No.: 18/165,799

(22) Filed: Feb. 7, 2023

(65) Prior Publication Data

US 2023/0252093 A1 Aug. 10, 2023

Related U.S. Application Data

(60) Provisional application No. 63/307,560, filed on Feb. 7, 2022.

(51) Int. Cl.
*G06F 16/9532* (2019.01)
*G06F 16/9538* (2019.01)

(52) U.S. Cl.
CPC ...... *G06F 16/9532* (2019.01); *G06F 16/9538* (2019.01)

(58) Field of Classification Search
CPC .................. G06F 16/9532; G06F 16/9538
See application file for complete search history.

(56) References Cited

U.S. PATENT DOCUMENTS

| | | | | |
|---|---|---|---|---|
| 10,305,758 B1* | 5/2019 | Bhide | ............... | G06F 11/328 |
| 10,505,825 B1* | 12/2019 | Bettaiah | ............ | G06F 16/24578 |
| 11,537,627 B1* | 12/2022 | Baskaran | .............. | G06F 16/951 |
| 11,715,051 B1* | 8/2023 | Baskaran | ................. | G06N 5/04 |
| | | | | 707/758 |
| 11,755,559 B1* | 9/2023 | Tankersley | .......... | G06F 16/2358 |
| | | | | 707/694 |
| 2003/0144868 A1* | 7/2003 | MacIntyre | ........... | G06Q 10/063 |
| | | | | 707/999.107 |

(Continued)

OTHER PUBLICATIONS

International Application No. PCT/US2023/012503, "International Search Report and the Written Opinion", mailed May 17, 2023, 12 pages.

*Primary Examiner* — Mark E Hershley
(74) *Attorney, Agent, or Firm* — Kilpatrick Townsend & Stockton LLP

(57) ABSTRACT

Techniques are described herein for selecting a template for efficient generation of dashboards for the template that derive insights into website performance. A client can provide search criteria, and, in response, the client can view and select a template that matches the context in which the client would like insights into the website data. The client can interact with the selected template to populate dashboards for the selected template. An identification of a metric can be detected for a placeholder field for a dashboard, and a specification of event type(s) to be used in populating the metric can be obtained. The dashboard can be loaded in memory, and user session data can be processed to detect events in the user session data. Metrics can be generated in the dashboard using the events in the user session data. The metric in the dashboard can be displayed at the client device.

20 Claims, 21 Drawing Sheets

(56) References Cited

U.S. PATENT DOCUMENTS

| | | | |
|---|---|---|---|
| 2012/0124496 A1* | 5/2012 | Rose | G06Q 20/3224 |
| | | | 715/763 |
| 2012/0259891 A1* | 10/2012 | Edoja | G06Q 30/02 |
| | | | 707/E17.005 |
| 2013/0046771 A1* | 2/2013 | Moitra | G06F 16/951 |
| | | | 707/E17.084 |
| 2015/0212663 A1* | 7/2015 | Papale | G06F 16/245 |
| | | | 715/762 |
| 2016/0127808 A1* | 5/2016 | Wong | H04Q 3/0087 |
| | | | 379/112.04 |
| 2016/0366036 A1* | 12/2016 | Gupta | G06F 3/0481 |
| 2017/0046374 A1* | 2/2017 | Fletcher | G06Q 10/20 |
| 2018/0024901 A1* | 1/2018 | Tankersley | G06Q 10/06393 |
| | | | 707/694 |
| 2019/0026786 A1* | 1/2019 | Khoury | G06Q 30/0271 |
| 2019/0260818 A1* | 8/2019 | Ciabarra, Jr. | G06F 11/3698 |
| 2019/0312979 A1* | 10/2019 | Sharma | H04Q 3/0087 |
| 2019/0361721 A1* | 11/2019 | Massoudi | H04L 9/3247 |
| 2020/0110829 A1* | 4/2020 | Cook | G06F 16/26 |
| 2020/0153690 A1* | 5/2020 | Basu | H04L 63/10 |
| 2021/0042796 A1* | 2/2021 | Khoury | G06Q 30/0272 |
| 2021/0224858 A1* | 7/2021 | Khoury | G06Q 30/0276 |
| 2021/0342785 A1* | 11/2021 | Mann | G06F 40/186 |
| 2022/0179665 A1* | 6/2022 | Rathod | G06F 9/451 |
| 2022/0229859 A1* | 7/2022 | O'Neill | H04L 67/12 |

* cited by examiner

Create New Template

● Provide details around the guide you are building. These will be editable as you build your guide template.

Name*

Text Field — 202

Description* — 204

Cancel    Create

Guides Available for [Industry Selected]                              🔍 Search

900 ⟶

902 ⟶

Cost
☐ Included with License
☐ Custom Quote

Category Header
☐ Category/Tags
☐ Category/Tags
☐ Category/Tags
☐ Category/Tags

Cost
☐ Included with License
☐ Custom Quote

Status
☐ Already Installed

| Guide Name (See Details →) Guide Description keep it short and sweet to not overwhelm the page (Included with license) | Guide Name Guide Description keep it short and sweet to not overwhelm the page (Included with license) | Guide Name Guide Description keep it short and sweet to not overwhelm the page (Included with license) |
|---|---|---|
| Guide Name Guide Description keep it short and sweet to not overwhelm the page (Included with license) | Guide Name Guide Description keep it short and sweet to not overwhelm the page (Included with license) | Guide Name Guide Description keep it short and sweet to not overwhelm the page (Included with license) |
| Guide Name Guide Description keep it short and sweet to not overwhelm the page (Included with license) | Guide Name Guide Description keep it short and sweet to not overwhelm the page (Included with license) | Guide Name Guide Description keep it short and sweet to not overwhelm the page (Included with license) |

FIG. 10

Analyze Adam's Template Metric 1 Filtered by [⊕ Add or Compare Segments] grouped by ⊕ Add Dimension ↓ Create Template Metric ◄

% Rate
Define a ratio to understand how often a scenario occurs.

\# Aggregate
Use aggregate functions like an average, sum, or count

[📅 Yesterday(MST) | by | Hour] ✕ Compare to Past — 1502

Adam's Template Metric 1

↺ Define Metrics  [<]

Create Template Aggregate Metric

Label Metric*
Add Label to y-axis

[Count ∨]  ✕
⊕ Add Note

Column: None (editable by Installer) ∨  ✕
⊕ Add Note

⇅ All Users · All Traffic 🔗
⊕ Add Note

Scope Metric by Page/Events  [Add]
⊕ Add Note 123,456  ∨

Trend
◉ Increases are Good(Green)  ∨

Feature Metric KPI above Chart ⬤
123,456  ∨

FIG. 15B

TEMPLATE BUILDER AND USE FOR NETWORK ANALYSIS

CROSS-REFERENCE TO RELATED APPLICATIONS

The present application is a non-provisional of and claims priority to U.S. Application No. 63/307,560, filed Feb. 7, 2022, the disclosure of which is incorporated by reference in its entirety.

BACKGROUND

The present disclosure relates generally to monitoring user interactions with a website during a web session and evaluating a website's performance, e.g., to detect problems with the website. Typically, a user can interact with a website that includes one or more web pages by interacting with one or more interfaces navigating the user across the web pages. During the web session, multiple aspects relating to the user web sessions and website network performance can be tracked.

As digital monitoring of user interactions on websites becomes more common, digital administrators desire tools to identify issues with websites and alerting of the issues on a website's performance more accurately and efficiently. Therefore, there is a need for improved systems and methods to detect and notify website owners about problems in a website performance.

SUMMARY

Techniques are described herein for selecting a template for efficient generation of dashboards for the template that derive insights into website performance. A client can provide one or more search criteria, and, in response, the client can view and select a template that matches the context in which the client would like insights into the website data. The client can interact with the selected template to populate dashboards for the selected template. An identification of a metric can be detected for a placeholder field for a dashboard, and a specification of event type(s) to be used in populating the metric can be obtained. The dashboard can be loaded in memory, and user session data can be processed to detect events in the user session data. Metrics can be generated in the dashboard using the events in the user session data. The metric in the dashboard can be displayed at the client device. The metric can be displayed in various ways and using various portions of user session data, e.g., according to segments, dimensions, and funnels.

In an illustrative embodiment, a dashboard builder system can obtain search criteria for selecting a template from a set of templates from a client device associated with a client. Each template can provide one or more dashboards configured to visualize aggregated user web session data for a website. A subset of one or more templates can be identified from the set of templates that correspond with the search criteria. A selection of a first template can be obtained (e.g., from the client via client device). The first template can include a set of one or more metrics and placeholder field comprising inputs for specifying events to populate the set of one or more metrics using user session data for the website.

The dashboard builder system can further detect an identification of a metric from the set of one or more metrics corresponding with the placeholder field based on an interaction with the client device. The metric can be of a predetermined type and having a predetermined definition. A specification of one or more event types to be used in populating the metric in the dashboard according to the predetermined definition can further be received.

The dashboard can be loaded into memory and user session data of user devices interacting with the website can be obtained. Events of the one or more event types in the user session data can be detected and the metric can be generated in the dashboard using the obtained user session data for the website processed according to the events of the one or more event types detected in the user session data. The metric in the dashboard can be displayed for the first template at the client device.

Other embodiments are directed to systems and computer readable media associated with methods described herein. A better understanding of the nature and advantages of embodiments of the present invention may be gained with reference to the following detailed description and the accompanying drawings.

BRIEF DESCRIPTION OF THE DRAWINGS

FIG. 2 illustrates an example screenshot for creating a new template, according to certain embodiments described herein.

FIG. 10 illustrates an example screenshot providing details for a series of relevant templates, according to certain embodiments described herein.

FIG. 15A shows an example interface for specifying a type of metric. FIG. 15B shows an example interface for specifying fields for a template metric.

TERMS

Figure 1:
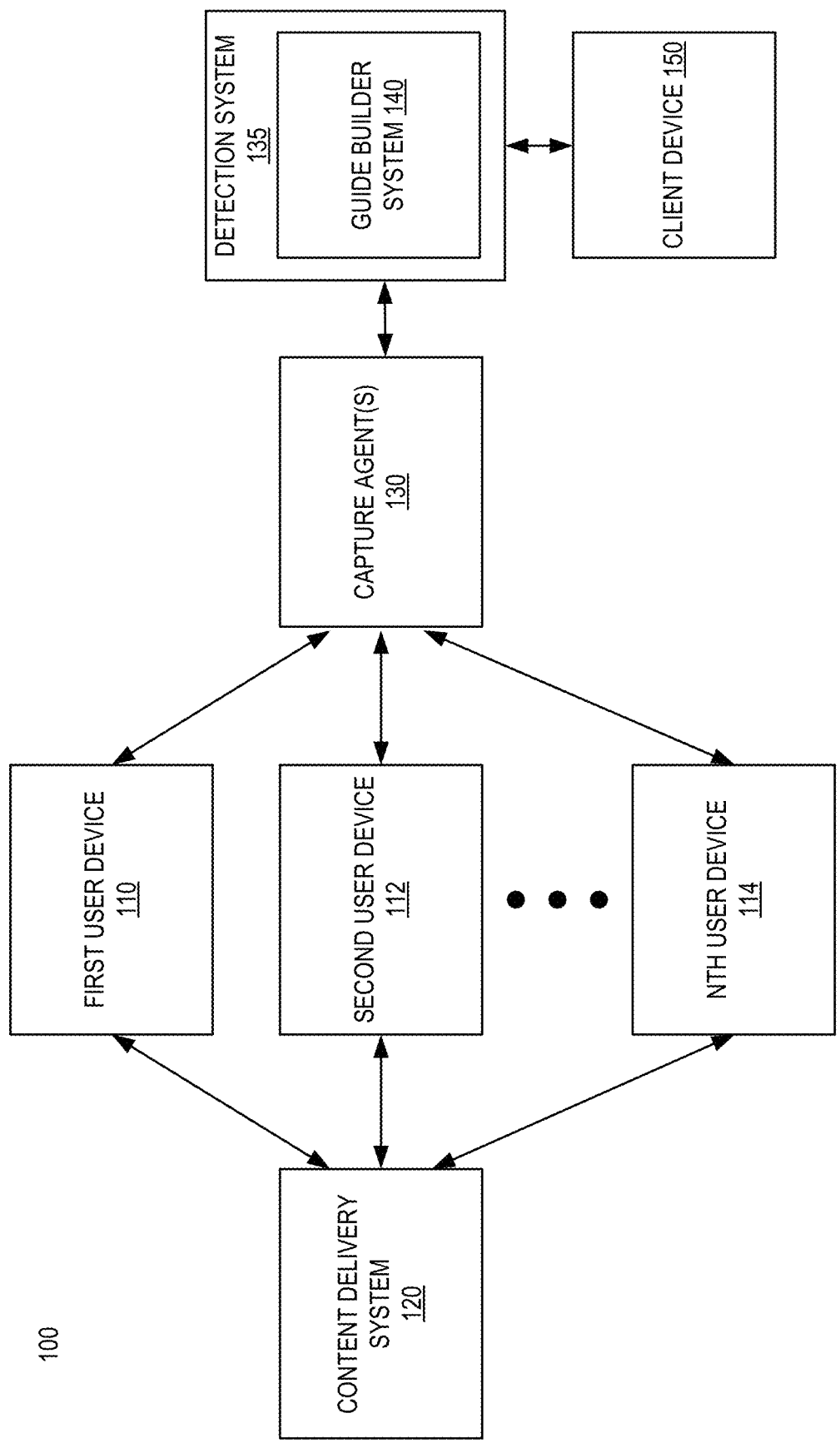
FIG. 1 illustrates an example of a distributed system for tracking user interactions with a website and building templates to visualize insights into the user session data, according to certain embodiments described herein.

Prior to further describing embodiments of the disclosure, description of related terms is provided.

As used herein, a "website" corresponds to any collection of content and/or services hosted on a server that can be accessed by user devices. A user device can access a website using a browser or a native application, e.g., a dedicated application that interacts with a dedicated server as opposed to a browser, which can access a variety of websites.

A "user" may include an individual that uses a website using a user device. The user may also be referred to as a "consumer" or "customer" depending on the type of the website.

A "client" may include an individual or entity that owns a website. The client may also be responsible for maintaining and presenting the website to a user. The client may employ some individuals (e.g., web developers) for the purpose of maintaining the website. The client may also be referred to as a "website owner" or "website provider."

A "user device" may comprise any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of client devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may comprise any suitable hardware and software for performing such functions and may also include multiple devices or components (e.g., when a device has remote access to a network by tethering to another device—i.e., using the other device as a modem—both devices taken together may be considered a single communication device).

A "client device" may comprise any suitable computing device that can be used for communication. The client device may be a computing device of an administrator of a web server hosting a website.

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "session" or a "web session" generally refers to a set of user interactions with a website, which can include any user-accessible server, e.g., that may be accessed by a browser or native application. The session may include interactions starting with a user accessing a webpage of the website (e.g., using a web browser or other software application, e.g., a native application) and ending with the user ceasing interactions with the website (e.g., closing a webpage of the website within the web browser or software application). The time-length of the session in seconds, minutes, and/or hours can be determined based on a start time when the user first interacted with the website to an end time of the last interaction made by the user. The web server hosting the website may store an identifier of the session and other information associated with the session (e.g., elements or items of the website selected by the user, or information input by the user).

A "session event" or an "event" can include a defined interaction or communication between a user device and a website. An event can refer to an event type (e.g., a definition) or to a specific instance of an event type, e.g., with an associated event ID that is sent from a user device to a detection system. The event can be defined by a client (e.g., an operator of the website). Events can be tracked and can be used as an input to a field (e.g., to a count of events of a particular type, an average value for an event) as part of defining a metric. As examples, an event can include click of a particular button, a selection of modification of an object in a document object model (DOM), an amount of a transaction, a visit to a particular page of a website, a view of a page on a native application, etc. For example, an event can include a promo code or a discount associated with the promo code. As another example, an event can be the initiation of a web sessions, so that a number of web sessions can be tracked for the website. A column of a table for a website can correspond to a particular event type, where the column stores information gathered using event messages with a particular event ID.

A "metric" can include a value tracking an aspect of the performance of a website over time. Metrics can be determined from events that are defined for tracking. Example metrics include a conversion rate, a page load time, a number of user sessions, etc. An analysis of multiple types of events can be combined to derive a metric. For example, deriving a conversion rate metric includes comparing a number of conversions on the website with a total number of web sessions. In some instances, all metrics already configured for the website can be provided as part of a table.

A "dimension" can include an attribute of a session, e.g., applications used (such as a type of web browser) and a type of device. A particular attribute can have various attribute values, e.g., each type of web browser, including whether a native application is used. A native application corresponds to a dedicated application installed on a device that interacts with a particular server hosting a site. A "segment" can correspond to one or more particular attribute value, e.g., which is used to identify certain sessions that match the particular attribute value(s) for a particular attribute (dimension). A segment can correspond to sessions that include one or more specified pages (a page group). A "funnel" can provide an order of page groups, with a metric generated for each page group.

A "dashboard" can include a visual representation of one or more metrics, which can be displayed over time. An example dashboard can graphically represent an impact of a promo code on a total revenue for a website over time. The impact can be represented through multiple metrics. The dashboard can use values from multiple events as inputs to determine the metrics for the dashboard. For example, a dashboard can track the number of conversions (which could be a field that is displayed or a hidden field that is just used) and the total web sessions, and then use those field values in a formula to determine the conversation rate metric.

A "field" can include any value determined for a dashboard. A field can correspond to any value determine from tracking events. The number of web sessions is an example of a field. The field can be displayed or hidden, e.g., an intermediate value used to determine a displayed value. A metric is an example of a displayed field.

A "template" can include a preconfigured set of one or more dashboards for use in visualizing one or more metrics. The template can be specific to an industry or other context that can be searched, e.g., based on similar function or particular types of problems. Examples of similar function can include product discovery, merchandising, checkout, fulfillment, loyalty, or help, care, and fraud. Examples of technical focus can include timing performance, logged error messages, etc., thereby allowing to select IT/Technical Guides and filter down to those that are most relevant. An example template can provide a dashboard visualizing a promo code performance over time. The template can include a description or one or more keywords to uniquely identify the context for the template, e.g., so a user can perform a keyword search to identify relevant templates. A template can store or be associated with a specific set of metrics that are defined for the template. Thus, a template is defined by which metrics are associated with it. Each metric of a template can require values (fields) determined from one or more types of events. If an event is not defined for a client, then any metrics that require that event are not available for the template. A client can be prompted to define a required event in order to view a particular metric. A table can define the events that are required for each metric. A table can also list the events and which metrics use a particular event.

A "network operation" generally refers to an operation performed by a client device (e.g., a web server) to load or display a webpage on a user device. The network operation may be an event that occurred during a web session. In an example implementation, a timing metric may include timing values involving network operations that occurred during a web session. For example, for a page load time metric, timing values involving certain network operations such as a requesting a webpage, processing of a webpage using a Transmission Control Protocol (TCP) protocol and looking up a webpage on a Domain Name Server (DNS) may be combined. If looking up the webpage on the DNS takes too long, then the rest of the processes involved in loading the webpage may be delayed as well. Accordingly, a specific network operation may be responsible for a slow connection experience for a user which led the user to abandon a website or terminate a web session.

The term "providing" may include sending, transmitting, displaying or rendering, making available, or any other suitable method. While not necessarily described, messages communicated between any of the computers, networks, and devices described herein may be transmitted using a secure communications protocol such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

DETAILED DESCRIPTION

A number of users can interact with a website, with each user interaction comprising a user session. As the user interacts with webpages of the website, various aspects of each user session can be tracked. Further, user session data and network performance metrics can be aggregated and processed to derive insights into the performance of the website. In many instances, an operator of a website may want to visualize various aspects of the aggregated user web session data. For example, the aggregated user session data can be processed to visualize a number of concurrent web sessions over time (e.g., in a chart). As another example, the aggregated user session data can be processed to visualize a number of concurrent web sessions broken down by user device operating system. Various visualizations of the aggregated user session data can be used to derive insights into website performance.

As a first illustrative example, a client (e.g., an operator of a website) may want to track correlations between user sessions and load times (or other network operations) for the website. These metrics can provide insights into how performance issues at various webpages impacts a total number of users interacting with the website. The metrics can further be defined by segments of users based on certain attribute values of a dimension, such as user device web browsers, user device operating systems, etc. As another illustrative example, a client may want to track how a promotional code impacts a conversion rate and a transaction value for the website.

In any of these examples, a client may generate one or more dashboards (e.g., by building a template or installing/configuring a guide based on a template) to visually represent various aspects of the user session data and network performance data. For instance, dashboards can provide a chart mapping aggregated user sessions over time or a table illustrating a breakdown of aggregated user sessions by operating system. As another example, a dashboard can provide a chart of a conversion rate that combines a total number of aggregated user sessions and an aggregated number of transactions over a specified time period. The dashboards can be based off metrics already generated for a website or for a new metric that combine various metrics and generate a value according to an algorithm. The one or more dashboards can be created and used to derive insights into the website. A combination of one or more related dashboards can be part of a guide template (also called a template) as described herein. A guide can be configured from a guide template during an installation process.

A template can be generated for any of a number of different contexts relating to website performance. For example, templates can be generated with dashboards relating to an impact of a promo code on a website transaction value, a conversion rate for a website, page load times for the website, etc. As an example of a context, templates can differ based on industry, such as for retailers, airlines, hospitality entities, etc.

In many cases, a template may be built using a builder interface. Particularly, in some cases, a client (e.g., an administrator of a detection system or a website) may configure the builder interface to generate each dashboard to be part of a template. For example, a client may create custom visualizations of metrics for a website (e.g., to visualize aspects relating to a conversion rate of a website).

However, in such cases, the guide templates created by clients or guides installed by clients may not be shared or capable of being utilized by another client. For instance, guide templates can be stored in one location in a database (or in separate databases), and installed guides can be stored in a different location. The installed templates can be partitioned by client and even specific teams within that client, such that other clients or teams cannot view the installed guides of other clients or teams. Accordingly, a second client may not be able to obtain a template previously created or installed by a first client to track aspects relating to a conversion rate of a website. Some guide templates can be created for all clients.

Accordingly, the present disclosure relates to a selection and configuration of a template specific to an industry or other context for efficient generation of dashboards and deriving insights into website performance. A guide builder system as described herein can obtain search criteria for selecting a template from a set of templates from a client device associated with a client. Each template can provide one or more dashboards configured to visualize aggregated user web session data for a website. A subset of one or more templates can be identified from the set of templates that correspond with the search criteria. A selection of a first template can be obtained (e.g., from the client via client device). The first template can include a set of metrics and placeholder field comprising inputs for specifying events to populate the set of metrics using user session data for the website.

The guide builder system can further detect an identification of a metric from the set of metrics corresponding with the placeholder field based on an interaction with the client device. The metric can be of a predetermined type and having a predetermined definition. A specification of one or more event types to be used in populating the metric in the dashboard according to the predetermined definition can further be received.

The dashboard can be loaded into memory and user session data of user devices interacting with the website can be obtained. Events of the one or more event types in the user session data can be detected and the metric can be generated in the dashboard using the obtained user session data for the website processed according to the events of the one or more event types detected in the user session data. The metric in the dashboard can be displayed for the first template at the client device.

A dashboard can be used in response to an alert and can be used to configure an alert. An alert can be generated when a metric of a template exceeds (e.g., above or below) a specific threshold. The alert can be presented to the website owner (or related client) for the owner to quickly identify issues with the website and focus on resolving the issues. The alert can be sent in various ways, e.g., via email or text message, and can specify a corresponding dashboard (e.g., via a link to the dashboard). When an alert is received, the client can conveniently select the corresponding dashboard to determine a potential cause of the website performance. The alerting also helps web developers of the website to identify problems (e.g., a network operation) contributing to problems with the website. Consequently, the web developers are able to efficiently pinpoint a code causing problems, and perform debugging to improve the website design and operation.

I. System Overview

FIG. 1 illustrates an example of a distributed system 100 for tracking user interactions with a website and building templates to visualize insights into the user session data, according to certain embodiments described herein. The distributed system is not intended to suggest any limitation as to scope of use or functionality of described embodiments.

The distributed system 100 may include one or more user devices, such as first user device 110, second user device 112, and nth user device 114. Each of the one or more user devices may be operated by a different user. For example, a user may be using an application for presenting content on a user device. The application may be a browser for presenting content from many different sources using uniform resource locators (URLs) to navigate to the different sources or an application associated with a defined number of one or more sources (e.g., an enterprise application for content associated with an enterprise).

The distributed system may further include content delivery system 120. Content delivery system 120 may be implemented to store content, such as electronic documents (e.g., a collection of webpages for a website). In one illustrative example, content delivery system 120 may be a web server that hosts a website by delivering the content.

The one or more user devices (e.g., first user device 110, second user device 112, and nth user device 114) may communicate with content delivery system 120 to exchange data via one or more communication networks. Examples of a communication network include, without restriction, the Internet, a wide area network (WAN), a local area network (LAN), an Ethernet network, a public or private network, a wired network, a wireless network, and the like, and combinations thereof.

In one illustrative example, first user device 110 may exchange data with content delivery system 120 to send instructions to and receive content from content delivery system 120. For example, a user device may send a request for a webpage to content delivery system 120. The request may be sent in response to a browser executing on the user device navigating to a uniform resource locator (URL) associated with content delivery system 120. In other examples, the request may be sent by an application executing on the user device.

In response to the request, content delivery system 120 may provide multiple webpages (or documents to implement the webpage, such as a Hypertext Markup Language (HTML) document) of the website to the user device. In some examples, the response may be transmitted to the user device via one or more data packets. The content delivery system 120 may deliver a web document or an original Document Object Model (DOM) associated with the webpage in response to the request. The content delivery system 120 may also capture and store certain timing information (e.g., time at receiving a request for a web document, an upload time for the requested web document, receiving acknowledgement after uploading the web document, etc.) for the requested webpage. Network operations other than timing information may also be captured.

While the above description relates primarily to providing webpages, it should be recognized that communications between user devices and content delivery system 120 may include any type of content, including data processed, stored, used, or communicated by an application or a service. For example, content may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. A BLOB may include a collection of binary data stored as a single entity in a database management system, such as an image, multimedia object, or executable code, or as otherwise known in the art. For another example, content may include an extended markup language (XML) file, a JavaScript file, a configuration file, a visual asset, a media asset, a content item, etc., or a combination thereof.

The distributed system 100 may further include capture agent(s) 130 that monitors, captures, and stores timing values and certain events that occur on user devices. For example, a user device may display a webpage. In such an example, capture agent(s) 130 may capture one or more interactions with the webpage that occur on the user device, such as movement of a mouse cursor, clicking on a certain button, or the like. The capture agent(s) 130 may also capture timing values for different timing metrics for webpages of a website. The capture agent(s) 130 may also capture user activities on specific attributes such as a specific browser or user device. As illustrated in FIG. 1, the capture agent(s) 130 may be communicatively coupled (e.g., via one or more networks) to each of one or more user devices. For example, an instance of the capture agent(s) 130 may be communicatively coupled to first user device 110.

In some examples, instead of being separate from the user devices, an instance of capture agent(s) 130 may be executed on each of the user devices. For example, the capture agent can be retrieved from a third party server according to a link provided in the website provided from content delivery system 120. In such examples, an additional portion of capture agent(s) 130 may be separate from each of the user devices, where the additional portion communicates with each instance.

In addition or in the alternative, capture agent(s) 130 may be communicatively coupled to content delivery system 120 via a communication connection. In some scenarios, the capture agent(s) 130 may receive (e.g., via push or retrieval) certain data about user activities from the content delivery system 120, as well as content associated with the website (e.g., a DOM of a web page). In some implementations, a first instance of the capture agent(s) 130 may be loaded on a first web session on a first user device 110. Similarly, a second instance of the capture agent(s) 130 may be loaded on a second web session on a second user device 112. The first and second instances of capture agent(s) 130 monitors and captures user activities or actions for the website on the first and second devices. The first and second instances then sends the data to the capture agent(s) 130 which further stores the data. In an alternate embodiment, the capture agent(s) 130 may be an API plugged into a browser (e.g., Chrome, Firefox, etc.) to monitor timing values. The browser plugins may monitor activities so it knows a user clicked a button asking of a new webpage.

The distributed system 100 may further include a detection system 135. The detection system 135 can process data provided by capture agent(s) 130 and detect events in the obtained data. For instance, the detection system 135 can process aggregated user session data (captured by capture agent(s) 130 and derive metrics quantifying various aspects of the aggregated user session data.

The detection system 135 may further include an alerting system. In some implementations, a client or a website owner may be provided with a user interface for the alerting system, where the client may select attributes and attribute values to analyze a website's performance, e.g., to identify a certain segments of users for which a performance metric is deficient by being below a threshold. In alternative implementation, the one or more attributes to analyze and alert about the website may be configured within the guide builder system 140 without requiring a client to provide or choose attribute within a user interface. The configuration of which attributes to detect may involve detecting anomalies in web session events (e.g., errors, user interactions, or pre-defined events), and then identifying attributes that are correlated to those anomalous web sessions.

In an illustrative embodiment, the alerting system may analyze in user interactions based on the one or more performance metrics and alert about performance anomalies with the website based on the evaluation. For example, an alerting system may be provided to evaluate and alert about the website's performance. The alerting system, for various attributes (e.g., a type of device, a web browser, etc.) related to requests for a website from user devices, determines a set of attribute values (e.g., mobile phone, laptop computer, etc. are attribute values for a type of device attribute) for evaluating the website's performance. The alerting system can determine a set of time-windows for each of the set of the attribute values and retrieves a set of performance metrics for the time-windows from historical web sessions associated with the attribute values. The alerting system then determines performance ranges based on the set of performance metrics for the time-windows. The alerting system assigns weights to the performance ranges and determines an evaluation range based on weighted performance ranges. The alerting system compares the performance metrics for a current time of evaluation with the evaluation range and alerts a client about performance anomalies if the performance metrics are out of the evaluation range.

In some implementations, a client or a website owner may be provided with a user interface for the detection system, where the client may select one or more timing metrics to analyze a website's performance. In alternative implementation, the one or more timing metrics to analyze a specific website may be configured within the detection system 135. In an alternative embodiment, the detection system 135 may retrieve one or more timing metrics from a capture agent(s) 130 without requiring a user to select a timing metric.

The detection system 135 can then retrieve timing values for the selected timing metrics from the capture agent(s) 130. The retrieved timing values may be timing values captured by the capture agent(s) 130 from multiple web sessions on multiple user devices for the set of webpages of the website. The detection system 135 may further perform a timing analysis on the set of webpages for the website.

The detection system 135 can further include a guide builder system 140. The guide builder system 140 can implement a platform allowing for building and interacting with templates as described herein. The guide builder system 140 can use a generated guide to analyze user session data and populate metrics. The guide builder system 140 can also facilitate the building and populating of one or more dashboards from a selected template. For instance, guide builder system 140 can receive, via a placeholder field, a specification of one or more event types to be used in populating the metric in the dashboard according to a predetermined definition of the metric. The metric can be generated in a dashboard for a selected template using obtained user session data for the website processed according to events of the one or more event types detected in the user session data. The populated dashboards can be provided to a client device 150 for subsequent review, providing insights into various aspects of the website.

The client device 150 can include a computing device associated with a client (e.g., an operator of the website). For example, the client, via client device 150, can interact with guide builder system 140 to select a template, identify metrics to be associated with one or more dashboards, and receive the template that includes one or more populated dashboards as described herein. Detection system 135 can perform monitoring of many different content delivery systems (e.g., 10, 50, 100, 500, 1,000, or more websites) and corresponding client devices for an account subscription.

As described above, capture agent(s) 130 may be implemented at least partially on a user device (e.g., client-side) where timing values and events are to be captured. In such embodiments, capture agent(s) 130 may be implemented in a variety of ways on the user device. For example, the capture agent(s) 130 may be implemented as instructions accessible in a library configured on the user device. The capture agent(s) 130 may be implemented in firmware, hardware, software, or a combination thereof. Capture agent 130 may provide a platform or an interface (e.g., an application programming interface) for an application to invoke the capture agent(s) 130 to monitor operations performed by a user device. In some embodiments, capture agent(s) 130 may be an application (e.g., an agent) residing on a user device. Capture agent 130 may be implemented using code or instructions (e.g., JavaScript) embedded in an application.

Each of first user device 110, second user device 112, nth user device 114, content delivery system 120, capture agent(s) 130, guide builder system 140, and/or client device 150 may include one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Each of first user device 110, second user device 112, nth user device 114, content delivery system 120, capture agent(s) 130, guide builder system 140, and/or client device 150 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like.

Each of first user device 110, second user device 112, nth user device 114, content delivery system 120, capture agent(s) 130, guide builder system 140, and/or client device 150 may be implemented using hardware, firmware, software, or combinations thereof. In various embodiments, each of first user device 110, second user device 112, nth user device 114, content delivery system 120, capture agent(s) 130, guide builder system 140, and/or client device 150 may be configured to run one or more services or software applications described herein. In some embodiments, content delivery system 120, capture agent(s) 130, guide builder system 140, and/or client device 150 may be implemented as a cloud computing system.

Each of first user device 110, second user device 112, nth user device 114, content delivery system 120, capture agent(s) 130, guide builder system 140, and/or client device 150 may include several subsystems and/or modules, including some, which may not be shown. Subsystems and/or modules of each of first user device 110, second user device 112, nth user device 114, content delivery system 120, capture agent(s) 130, guide builder system 140, and/or client device 150 may be implemented in software (e.g., program code, instructions executable by a processor), in firmware, in hardware, or combinations thereof. The subsystems and/or modules of each of first user device 110, second user device 112, nth user device 114, content delivery system 120, capture agent(s) 130, guide builder system 140, and/or client device 150 may be implemented to perform techniques disclosed herein.

In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein.

Each of first user device 110, second user device 112, nth user device 114, content delivery system 120, capture agent(s) 130, guide builder system 140, and/or client device 150 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Each of first user device 110, second user device 112, nth user device 114, content delivery system 120, capture agent(s) 130, guide builder system 140, and/or client device 150 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof.

Each of first user device 110, second user device 112, nth user device 114, content delivery system 120, capture agent(s) 130, guide builder system 140, and/or client device 150 may provide some services and/or applications that are in a virtual or non-virtual computing environment. Such services may be offered on-demand to client devices. Website owners may use one or more applications to interact and utilize the services or applications provided by content delivery system 120, capture agent(s) 130, guide builder system 140, and/or client device 150. Services may be offered as a self-service or a subscription. Website owners or operators may acquire the application services without the need for users or visitors of websites to purchase separate licenses and support. Examples of services may include a service provided under a Software as a Service (SaaS) model, a web-based service, a cloud-based service, or some other service provided to a user device.

In some examples, a service may be an application service provided by content delivery system 120, capture agent(s) 130, guide builder system 140, and/or client device 150 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications. The cloud computing system may be implemented as a cloud-based infrastructure that is accessible via one or more networks. Various different SaaS services may be provided.

A user device may include or be coupled to a display. A user device may provide access to one or more applications (also referred to herein as an "application program"). An application of the one or more applications may present content using the display. It should be recognized that an application may be executing on a user device, content delivery system 120, capture agent(s) 130, guide builder system 140, client device 150, or a combination thereof. In some embodiments, an application may be accessed from one location and executed at a different location. For example, an application may be accessible at a client device as a service, but the application may be executing at guide builder system 140. An application may include information such as computer-executable or machine-executable instructions, code, or other computer-readable information. The information may be written in any suitable programming language to perform the various operations, functions, methods, and/or processes disclosed herein. The information may be configured for operation of the application as a program. Examples of applications may include, without restriction, a document browser, a web browser, a media application, or other types of applications.

In some embodiments, an application may be device specific. For example, the application may be developed as a native application for access on a particular device that has a configuration that supports the application. The application may be configured for a particular type of platform and/or particular type of device. As such, the application may be implemented for different types of devices. Devices may be different for a variety of factors, including manufacturer, hardware, supported operating system, or the like. The application may be written in different languages, each supported by a different type of device and/or a different type of platform for the device. For example, the application may be a mobile application or mobile native application that is configured for use on a particular mobile device.

In some embodiments, an application may generate a view of information, content, and/or resources, such as documents. For example, the application may display content to view on a user device. The view may be rendered based on one or more models. For example, a document may be rendered in the application, such as a web browser using a document object model (DOM). The view may be generated as an interface, e.g., a graphical user interface (GUI), based on a model. The document may be rendered in a view according to a format, e.g., a hypertext markup language (HTML) format. The interface for the view may be based on a structure or organization, such as a view hierarchy.

As described above, a guide can include one or more dashboards. A guide template can be first built, and then a guide for a particular client can be created from a guide template as part of an install process. A guide template can include placeholder fields that can be completed when installing for a particular client. As part of completing a placeholder field, the install process can use links to complete a placeholder holder field, where the link provides a definition (e.g., of an event already defined for the particular client) that is utilized in the placeholder field. Then once the placeholder field is associated (assigned) for a particular function (e.g., generating a metric) as part of the install process, the final guide can use session data to identify relevant data (e.g., a particular type of event) to complete the function (e.g., determining a metric).

II. Building a Guide Template

As described above, one or more dashboards can be built using one or more templates. The dashboards for a template can provide visualizations of various aspects of aggregated user session data. For example, a template can provide dashboards providing insights into user sessions for a website for use in optimizing a conversion rate for the website. A screenshot (e.g., 700) of an example template comprising multiple dashboards (e.g., charts 702, 704, 706, 708, 710) relating to conversion rate optimization is provided with respect to FIG. 7.

Further, as noted above, a dashboard can be built by a client. For instance, a client, via a client device 150, can interact with a guide builder system 140 to build a dashboard. FIGS. 2-7 provide screenshots of an example process to build a dashboard from a template.

FIG. 2 illustrates an example screenshot 200 for creating a new template. A client can interact with the dashboard builder system to create a new template (also referred to as a "guide"). For instance, a client can provide a name 202 and a description 204 of a template to be built. The description can include various metadata, e.g., tags corresponding to different contexts, such as industry for the template or other contexts. The template description can provide keywords or other information uniquely identifying features of the template. For example, the name 202 and/or description 204 can specify that the template provides aspects relating to conversion rate optimization for a website, which is another example of a context. When a client is creating, populating, or customizing a new dashboard using a template, search criteria about conversion rate can provide search results that include such a template.

Responsive to providing the title and/or description, the client can interact with a guide directory to build dashboards for the template. A dashboard can include various objects, which can be defined based on events sent from a user to a detection system (e.g., detection system 135). Thus, a dashboard can include information about performance metrics determined from captured events. The metrics can be determined for all users or a subset (segment) of sessions as defined by one or more attribute values. The metrics can be provided in various forms, as described herein. A segment can refer to the set of attribute values that are correlated. The segment can be defined using logical AND for different attributes and OR of different values of a same attribute.

Figure 3:
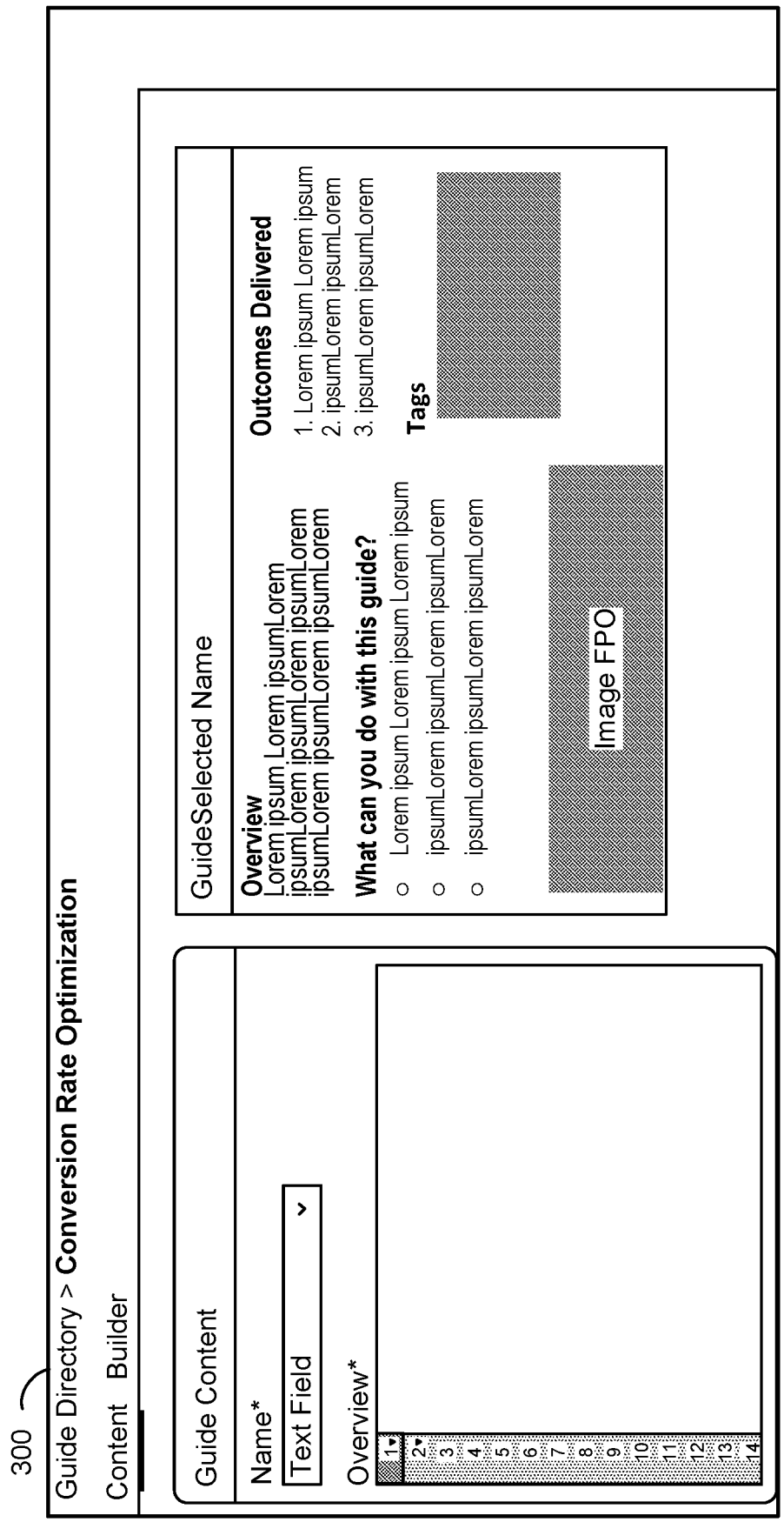
FIG. 3 is an example screenshot of a guide directory for a new template, according to certain embodiments described herein.

FIG. 3 is an example screenshot 300 of a guide directory for a new template. The guide directory provides details for the template and allows for the addition of content specific to the template. For example, the client can provide an overview of the template, what can be performed with the template, outcomes delivered with the template, and/or any corresponding tags for the template. For instance, the tags can provide keywords specific to the template for use in subsequent identification of the template as described herein.

Responsive to providing details regarding the template in a guide directory, a dashboard can be built.

Figure 4:
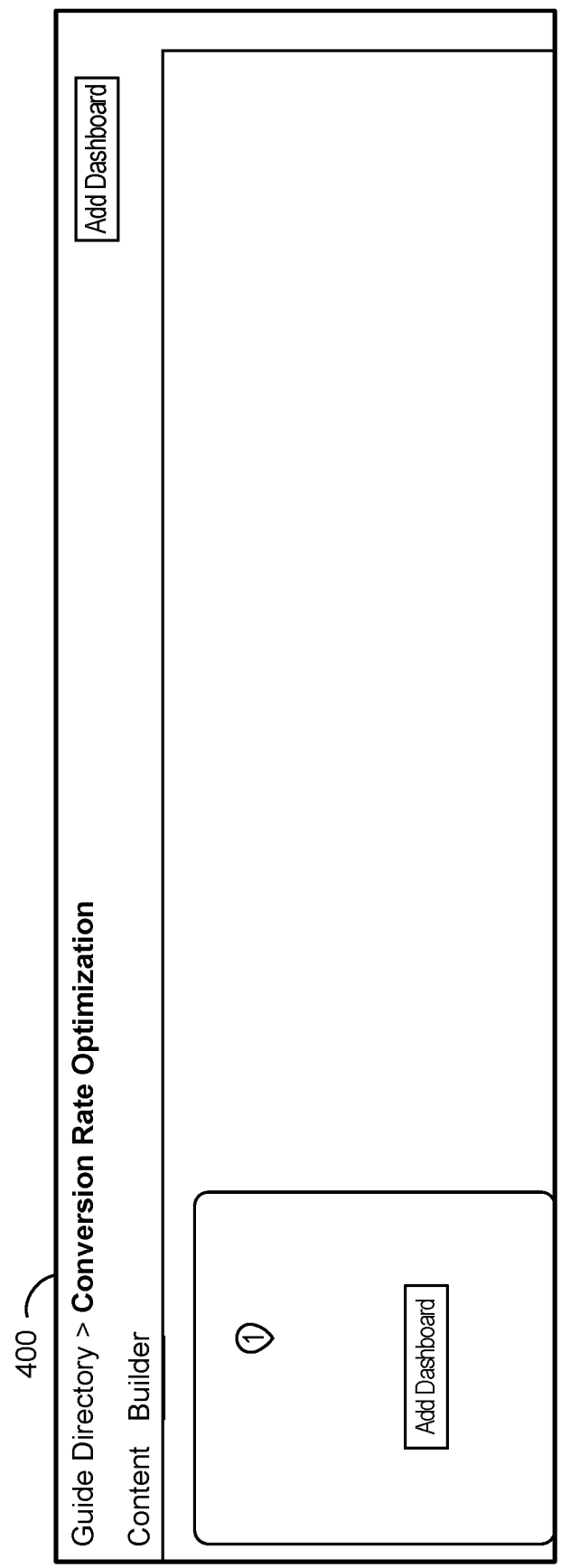
FIG. 4 illustrates an example screenshot for adding a dashboard to a guide, according to certain embodiments described herein.

FIG. 4 illustrates an example screenshot 400 for adding a dashboard. A client can add a dashboard to be part of the template. For instance, the dashboard can include a chart tracking a total number of user sessions over a time duration. The below process can be repeated for multiple dashboards that are included as part of the template.

After a selection to add a dashboard, the client can specify a card to be added. As mentioned above, a dashboard can include visualization of metrics, including charts, funnels, tables, maps, and sunbursts. These visualizations can be added as a card.

Figure 5:
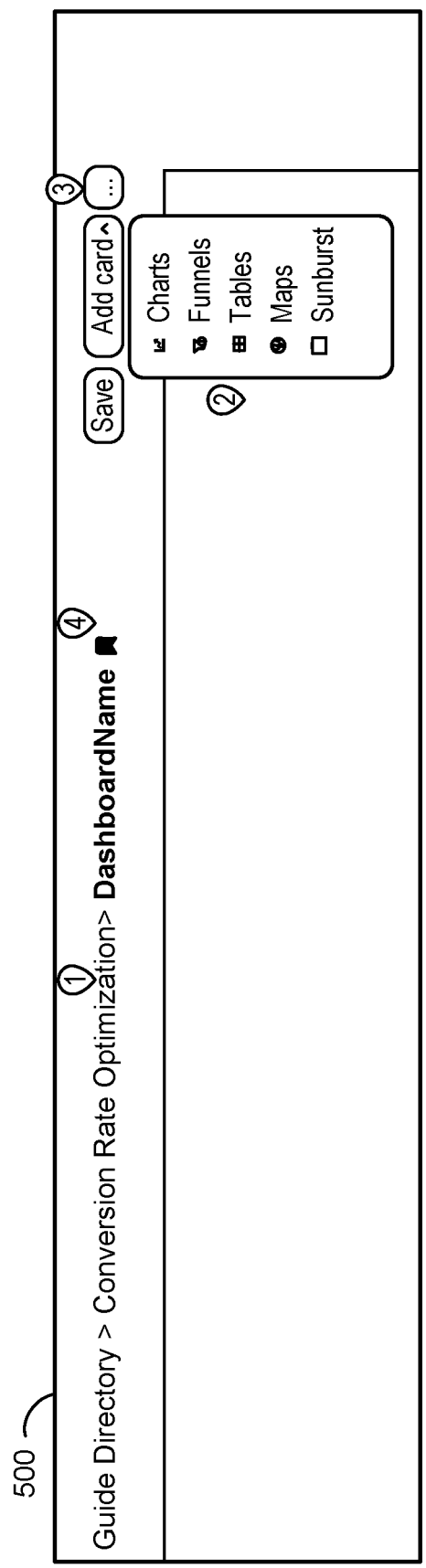
FIG. 5 illustrates an example screenshot for adding a card to a dashboard, according to certain embodiments described herein.

FIG. 5 illustrates an example screenshot 500 for adding a card to a dashboard. A card can specify a type of content included in a dashboard. A card can include any of a chart, funnel, table, map, starburst, etc., as part of a dashboard. For instance, the client can specify a chart to visualize a metric that tracks user sessions over time. Responsive to the addition of a card, the dashboard can be built.

A card is an object to visualize a metric, where the object can define how that metric (e.g., completion rate) is visualized, e.g., as a chart, table, funnel (step-by-step completion rate), etc. The visualization can be grouped by dimension, e.g., as configured during an installation process.

Figure 6:
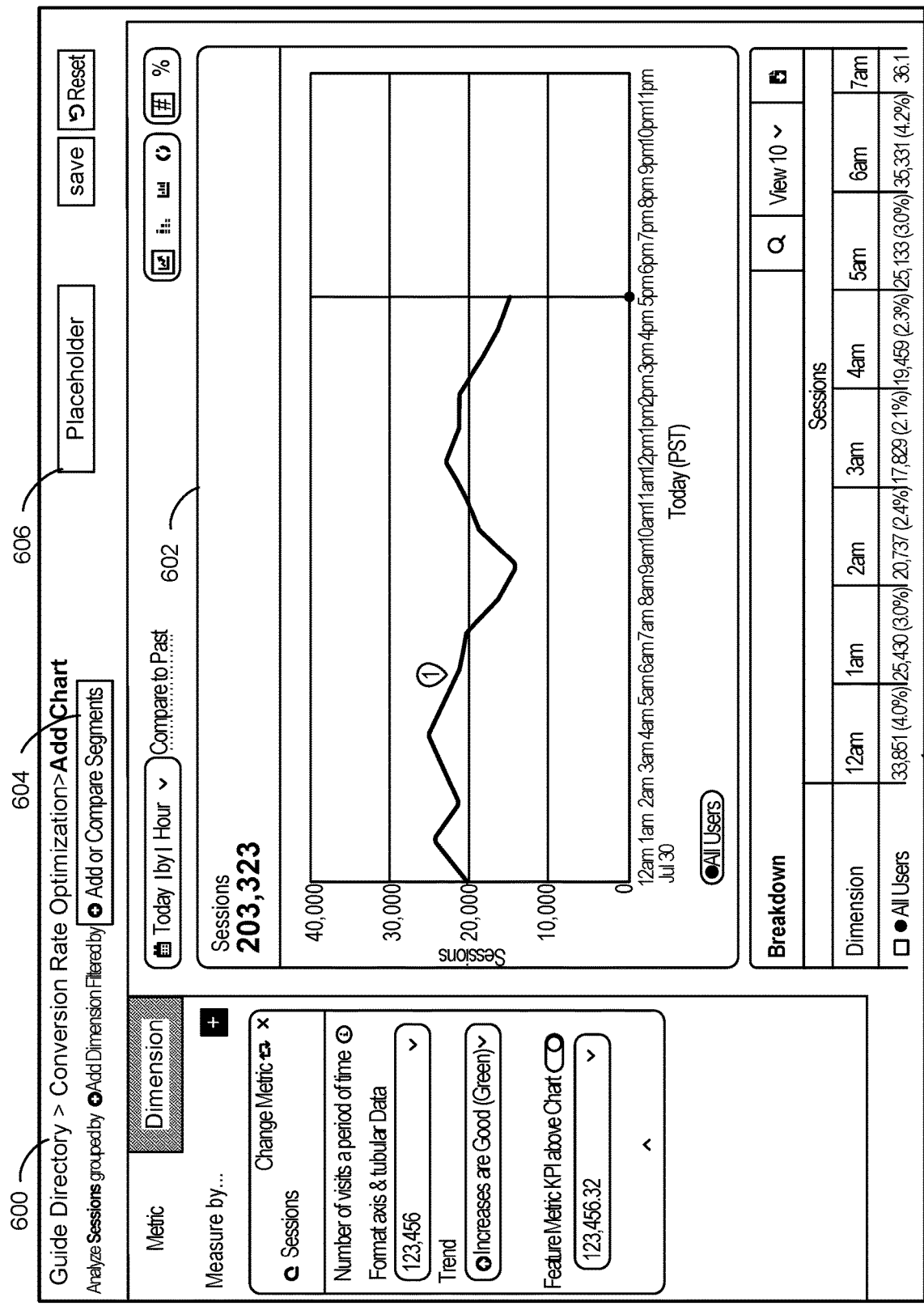
FIG. 6 illustrates an example screenshot of a dashboard with one visualization card, according to certain embodiments described herein.

FIG. 6 illustrates an example screenshot 600 of a dashboard. As shown in FIG. 6, a dashboard can include a chart 602 tracking user sessions over time. The chart (shown after install) can show trends in concurrent users of the website over time. The dashboard can be populated responsive to the client correlating a metric that tracks user sessions with a placeholder field (e.g., placeholder field 606). The dashboard can also include a table 608 illustrating user session data over time. The placeholder field can be filled in (completed) at time of installation for a client (e.g., for an account subscription associated with the client).

The metric option 610 can allow a user to see and/or configure a metric for use in visualizations. As shown, the user session metric is selected as the metric for the dashboard. Additionally, the chart is defined as a number of visits within a period of time.

In some instances, a segment of session data can be specified (e.g., to filter out unwanted traffic to compare different portions of session data) as part of the dashboard, e.g., use compare segments option 604. For example, a segment of user session data can include only certain user sessions having one or more specified attribute values, such as user sessions on a specific web browser, user sessions on devices using a specific operating system, etc. A segment can be used to remove sessions from a metric calculation where those sessions are not relevant to the particular metric.

Multiple segments corresponding to different attribute values of a same attribute (dimension) can be viewed in a single visualization card of a dashboard by selecting a group by dimension option. Grouping by dimension can further define details in the metric data, such as to show user session data by web browser type, for example. The different segments can be shown within a same chart, e.g., different lines for user devices with various web browsers.

The segments can be defined using a dimension option 620, which can allow a client to select various attribute values that may be required of the session data. Additionally or instead, a client can select an attribute type (dimension) for comparing segments. One or more dimensions (e.g., browser type, device type, browser version, etc.) can be specified for displaying the metrics that are particular to each of the attribute values of the selected dimension.

A template can include a set of one or more metrics that are specified. For example, the template can have the sessions metric defined to be part of the template. But the sessions metric can still be tailored to a particular account, thereby allowing use of a template but also allowing customization. A placeholder field can be used to define one or more events used for a particular metric of a template. For example, one or more events can define a traffic segment that the sessions metric should count.

The metric corresponding to the number of user sessions can be defined based on an event defined by the client. The client can define an event (e.g., an event message including an event ID) that is captured by a capture agent, where the event defines a user session has been initiated. Given that the client is logged in for a particular account, the system can assign the definition of the session event for that account to the metric corresponding to the number of sessions. In this manner, a user session can be tailored to the user session event as defined by a particular client account.

The dashboard can include a placeholder field 606 for specifying one or more event types assigned to a metric of the template. Thus, the placeholder field 606 can be used by the client to associate one or more event types with a metric tracking an aspect the aggregated user session data. For example, the association of a metric to an event type definition can occur by providing to the placeholder field 606 a link to an event type definition in a glossary specific to the client. The events of a particular type from the user session data can be used as inputs to the dashboard, which determines a value for a metric using the events. For example, the client can define a session event for placeholder field 606, which is then associated with the user session metric that tracks user sessions for the website. Responsive to associating placeholder(s) for a dashboard, the user session data can be processed to populate the dashboard. For example, the events of the defined type for placeholder field 606 can be aggregated to determine the value for metric 610.

Multiple dashboards can be added as part of a template. Each dashboard can uniquely visualize metric(s) for the website.

Figure 7:
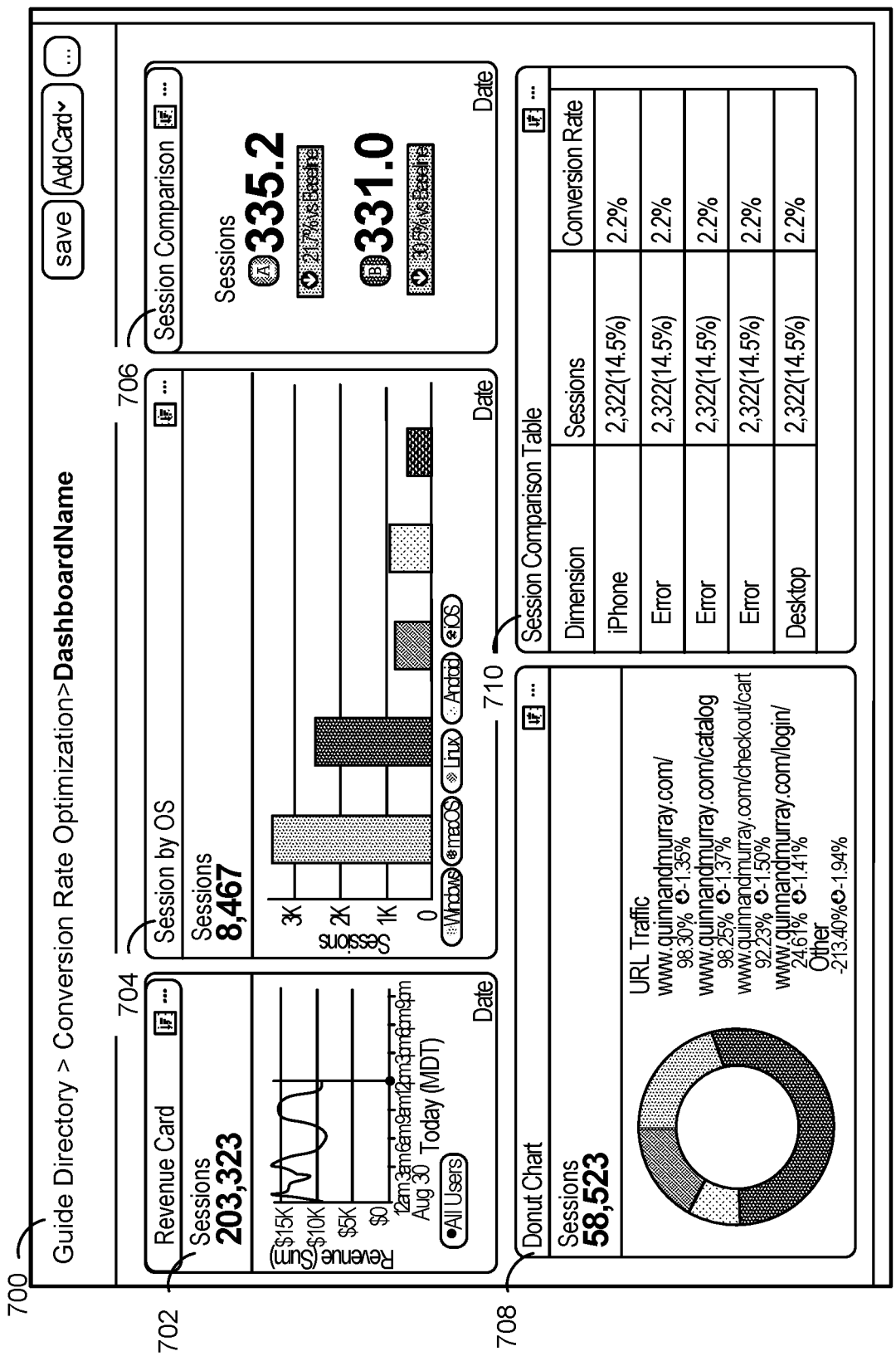
FIG. 7 illustrates an example screenshot of a template that includes multiple visualization cards, according to certain embodiments described herein.

FIG. 7 illustrates an example screenshot 700 of a template that includes multiple dashboards. For example, the template can include a first card 702 tracking user sessions over time. The template can also include a second card 704 breaking down sessions by operating system. The template can include a third card 706 comparing session types against a baseline and a fourth dashboard 708 providing a donut chart of user session traffic by webpage. The template can further provide a fifth card 710 providing a session comparison table by user device type. The cards can uniquely provide insights into various aspects of a website, such as for conversion rate optimization, for example.

Each visualization card or dashboard can have one or more metrics assigned to that dashboard, thereby providing a client the ability to use templates that are already created with relevant metrics. But within the pre-built template, there is flexibility to allow a client to associate a particular event type (as defined by the client) with a pre-assigned metric. Thus, a dashboard can provide a metric and a corresponding placeholder field for assigning one or more event types to each metric of a dashboard. Some aspects of a metric pre-assigned to a template can be configured, e.g., a dimension can be selected such that a corresponding segment can be visualized according to different attributes.

Responsive to creation of a template, the template can be added to a listing of templates. The template can be stored in the listing of templates based on keywords assigned to the template. For example, the template can be selected from the listing of templates and used to efficiently generate dashboards visualizing metrics for a website.

III. Installing

Once a guide template is built, it can be used to generate a guide for a particular client. The installing user can select a template from a library of templates and complete placeholder fields, e.g., using links to definitions (e.g., of event types, such as user (traffic segments), metric types (also referred to as template metrics), template dimensions, and template funnels). Items can be linked to certain fields of these defined objects. Examples items linked to complete those fields can include events, data collections (e.g., which table of data in a database), data columns (which column in a database table), and aggregation functions. The building (designing) and installing can be done by a client associated with a website or a client associated with the detection system, e.g., on behalf of a particular client.

Figure 8:
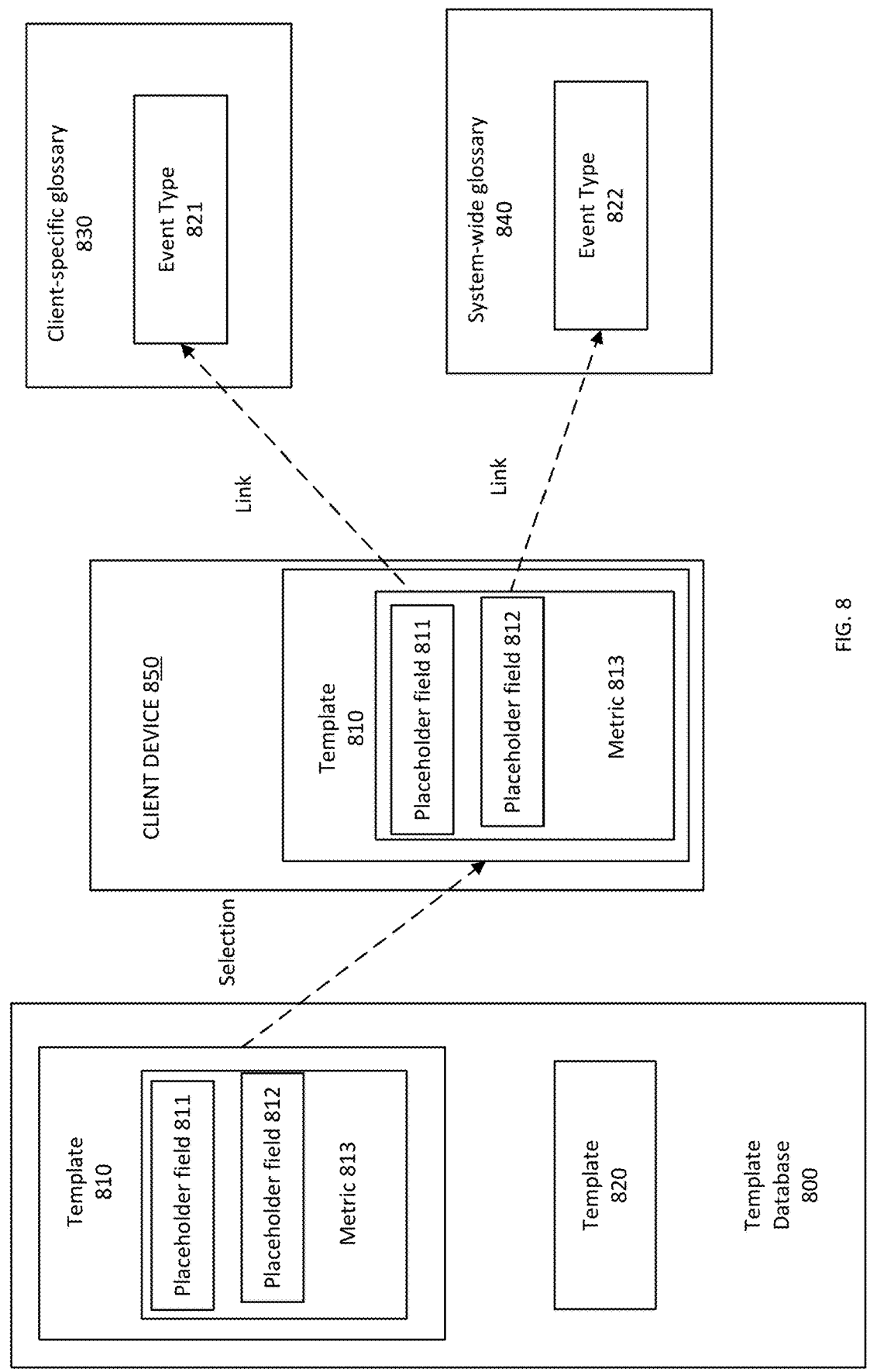
FIG. 8 is a high-level schematic of an installation process.

FIG. 8 is a high-level schematic of an installation process. A template database 800 includes a template 810 and a template 820, although many other templates can be stored. Each template can be categorized by context (e.g., an industry) and possibly subcontexts (subcategories). Template 810 includes a placeholder field 811 and a placeholder field 812, both of which can be used to generate a metric 813.

A client device 850 can select template 810 for installing. For ease of illustration, this installing is shown by the template 810 being copied to client device 850. In practice, the copy of template 810 can exist within the detection system, e.g., within the guide builder system, which can be use to create templates but also for installation as guides that can be used by clients.

Client device 850 can provide a link to event type 821 for completing placeholder field 811. This definition for an event can include an event ID, which can be used to identify certain event messages from user session data. The identified events can be counted and analyzed (e.g., as a sum, an average, or other statistical value) to generate metric 813. Event type 821 can reside in a client-specific glossary 830 that includes object definitions that are specific (and only accessible to the client(s) of a same account subscription). As part of installation, client device 850 can also provide a link to event type 822 for completing placeholder field 812. This definition for an event can include an event ID, which can be used to identify certain event messages from user session data. These identified events can also be counted. Event type 822 can reside in a system-wide glossary 840 that includes object definitions that are accessible to all clients.

A similar process may be performed for specifying dimensions, segments and funnels. A client-specific and global glossary may exist for each of dimensions, segments and funnels, as is described in more detail below.

A. Template Selection

A client can select a template from multiple available templates based on various search criteria. For instance, the client can provide keywords relating to an industry (e.g., airline, retailers), metrics (e.g., promo code, conversion rate), or other descriptive terms to identify a context for relevant templates. In some instances, a template can be selected based on drop down menus classifying templates by industry, metrics, etc. This can include browsing a structure of templates organized by industry and named according to a use case or a popularity or rating of each template.

In response to obtaining the search criteria, all relevant templates can be identified that correlate with the search criteria. For instance, the search criteria can be compared with terms associated with each template (e.g., as stored in a table) to identify one or more corresponding templates. The search can match on both a client-facing description as well as a collection of keywords for each template. The templates can then be sorted by relevance of the matches or a template rating or popularity. The corresponding templates can be provided to the client for the client to review. Further, the client can select a template from the corresponding templates.

Figure 9:
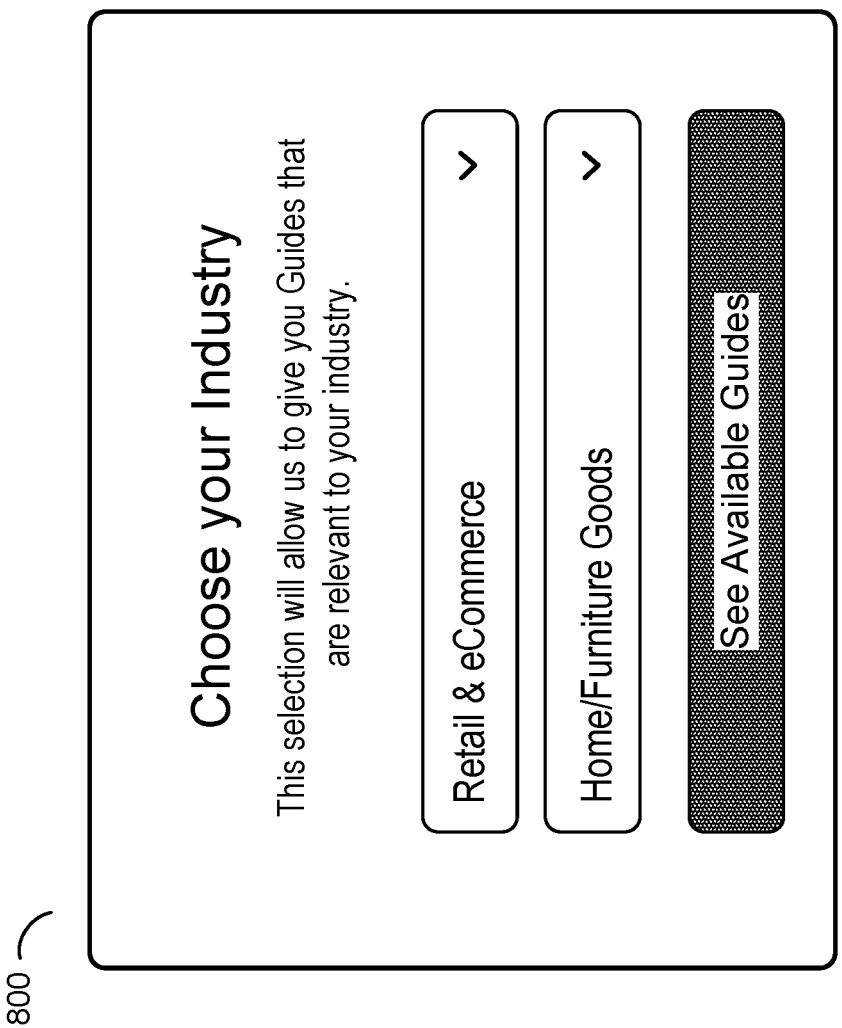
FIG. 9 illustrates an example screenshot for providing search criteria to select a template, according to certain embodiments described herein.

FIG. 9 illustrates an example screenshot 900 for providing search criteria to select a template. For instance, the client can select a relevant industry (e.g., retail and e-commerce) and select a relevant use case specific to the selected industry. Example use cases for retail and e-commerce can include promo code usage, purchase, product search, loyalty enrollment, or merchandising. The subcategory specifying example use cases can be selected from a drop-down menu by the client.

Another example search criteria can include an industry of "airline," and subcategories relating to ticket purchase, check-in, flight change, ancillary upgrades, loyalty enrollment. Another example search criteria can include an industry of "telecommunications," and subcategories relating to account information, services purchase, plan upgrade, or device upgrades. Another example search criteria can include an industry of "banking," and subcategories relating to log in, account creation, account information, additional services research. In some instances, the client can provide any search criteria to identify relevant templates, such as a relevant industry, keywords describing a use case, etc. Other example contexts are provided herein.

Responsive to providing search criteria, details for relevant templates can be provided. For example, search criteria can specify an industry as "Retail and ecommerce" and a subcategory can include "Home/Furniture Goods."

FIG. 10 illustrates an example screenshot 1000 providing details for a series of relevant templates. The relevant templates may correspond to a particular context, as described herein, e.g., an industry. The templates illustrated in FIG. 10 (e.g., template 1002) can include templates with a greatest relevance to search criteria provided by the client. For example, the listing of templates can be provided based on a relevance to search criteria, a rating of each template, and/or a popularity of each template. A description of each template can also be provided to provide greater details relating to each template. Further filtering via other search criteria can be specified, e.g., via options 1004 shown on the left of example screenshot 1000.

Each of the templates shown can be created as described herein and may include selections or definitions for page groups, segments, metrics, etc. that exist inside the template itself.

B. Configuration of a Guide Using Selected Template

Responsive to selection of a template (e.g., template 1002), the client can set up various object items specific to the template. Setting up an object can include providing definitions of an item, such as page groups, funnels, metrics, segments, dimensions, events, and errors. A template can include any number of each of these type s of objects.

Figure 11:
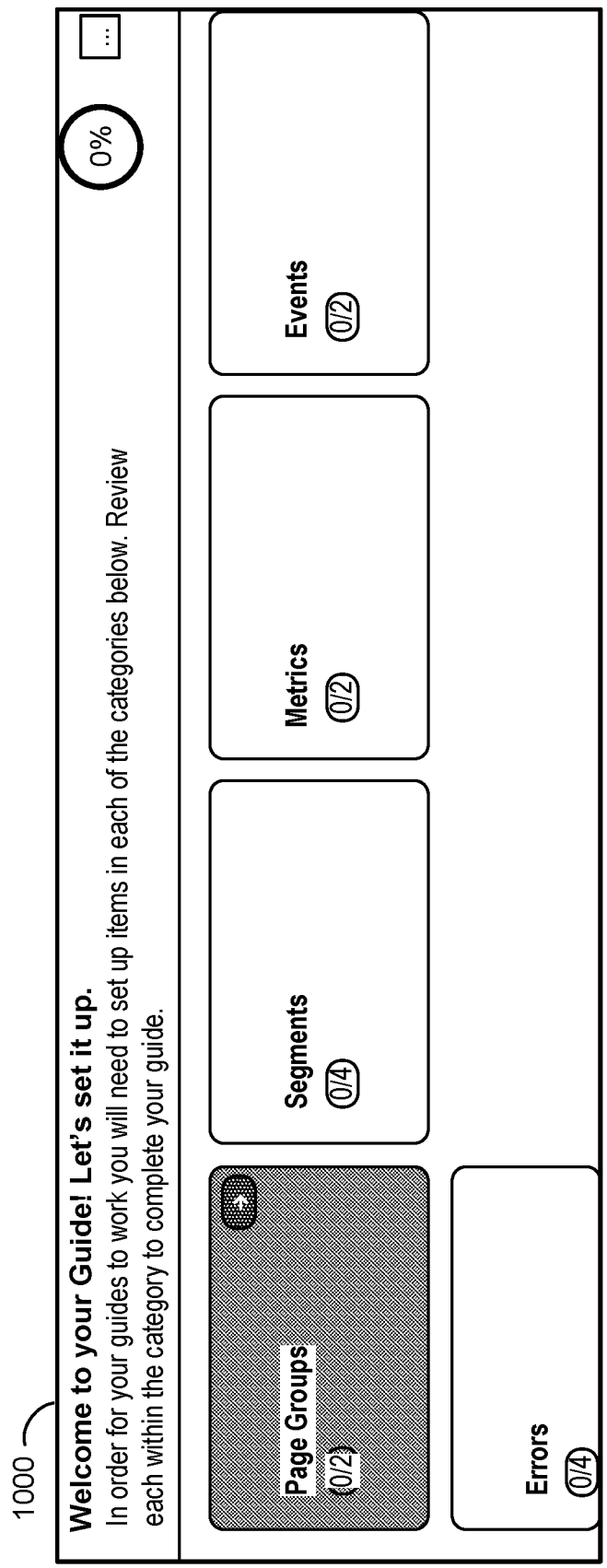
FIG. 11 illustrates an example screenshot for setting up dashboards for a selected template, according to certain embodiments described herein.

FIG. 11 illustrates an example screenshot 1100 for setting up one or more dashboards for a selected template. As shown in FIG. 11, items in various categories can be provided by a client. Example item categories can include page groups, segments, metrics, events, errors, etc. Each item can include one or more placeholder fields depending on what each placeholder is used for. For example, a placeholder for a metric can identify an aspect (event) of user session data to track for a metric for a website. The client can interact with each item category to identify relevant data for each placeholder field (e.g., by specifying an "event" that can be collected into a particular column of a client-specific table).

The client user can click each category and fill in all of the required placeholders of that type, possibly including funnels and dimensions. Completing the placeholder fields can include selecting columns of tables, e.g., via dropdown lists. Such columns can correspond to particular events that have been defined in event tables, where a client-defined event can provide an event ID for the detection system to identify events that are to be included in the specified column. Other item-specific tables can exist for other items, such as dimension tables, segment tables, and metric tables, all of which may be client-specific. Only a particular client may populate a placeholder field using such client-specific tables. Global tables may also exist and be selected by all clients.

As an example, the client can select a page group item category for completing. Completing any of the placeholder fields may include providing a link to an item (object) in a client-specific table. In some implementations, such an object can specify a column in a table of user session data for the client, where the column is populated using a definition of the item in the client-specific table for that category. For instance, an event object can specify an event ID that is used to count user messages (traffic from user of the website) matching that event ID for populating a corresponding column of the user session table.

Figure 12:
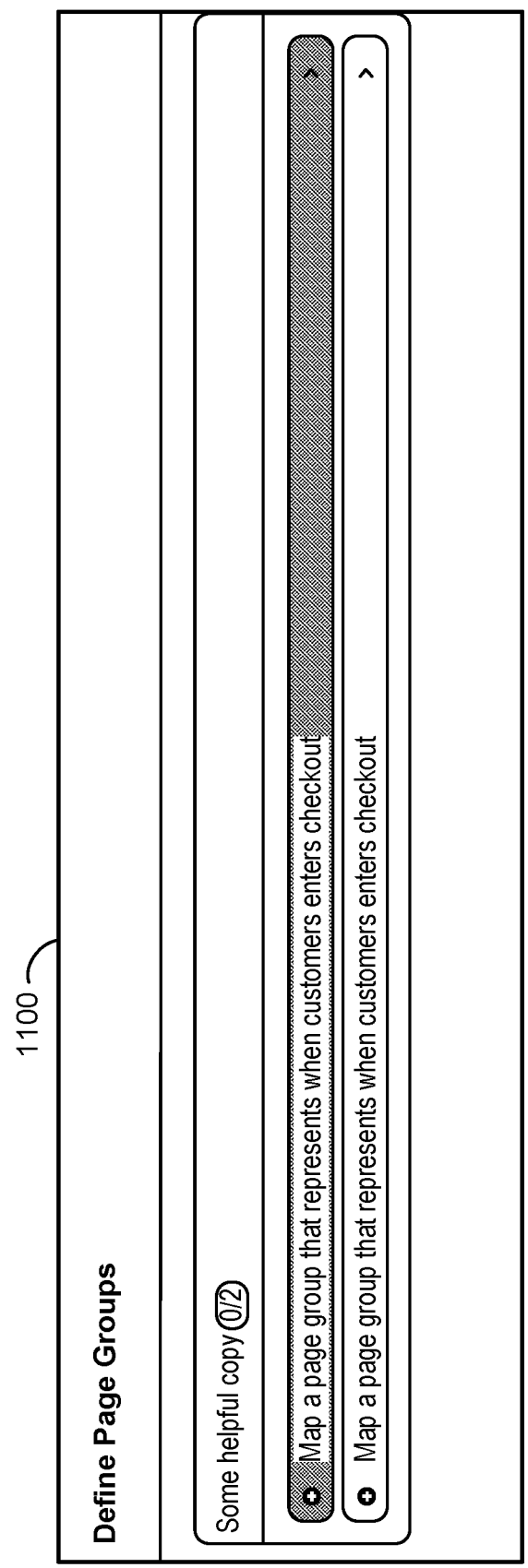
FIG. 12 illustrates an example screenshot for defining page groups, according to certain embodiments described herein.

FIG. 12 illustrates an example screenshot 1200 for defining page groups. For instance, a first page group can include a group of webpages that represent when a customer enters a checkout webpage. A second page group can include a group of webpages that represent when a customer enters a cart. The client can define webpages that are part of each page group for use in populating a dashboard that corresponds with the template.

Such page groups can be used to segment network traffic (e.g., retrieve only certain user session data) for use in determining a metric. In this manner, a guide (and its one or more dashboards) can filter to only the traffic that matters for the specific use case for that guide. For example, if a guide is meant to analyze the checkout process, a page group can filter out network traffic (e.g., sessions) that showed no intent to enter the checkout flow, such as users checking their order status, looking for company contact information, reading FAQs etc.

Page groups enable defining a list of page patterns that can be considered part of a group. For example, if a guide template is meant to focus on interactions with product details pages, a designer or installer can create a group where any page that contains '/product' is considered a PDP (products details page). Then the defined page group can be used to identify session data matching the page group to ensure that the guide will only include sessions that viewed one of those pages.

A page group can be viewed as an attribute value of a dimension (e.g., all page groups). In this manner, different values for a metric can be generated for different page groups, so as to see how each dimension value performs individually, as measured by that metric. Instead of measuring each different product (SKU) page individually, a product page group allows measuring an overall success of a PDP Page, regardless of the specific product. [0130] A page group can be used as one step in a funnel (e.g., bar chart where a metric value is displayed as a separate bar for sessions that reached a particular page or group of pages). For example, a step of a funnel for metric can use a count of sessions where the page group='PDP Page'.

After identification of relevant data for each placeholder field, each dashboard of a configured guide can be populated according to the defined metric(s), as well as any other items. An example template with multiple dashboards is FIG. 7 as described herein. The guide including the dashboards visualizing aspects of website data can be provided to a client via a client device.

IV. Generating Visualization in a Guide

Once a guide template has been installed as a functioning guide for a client, the detection system can use the guide to retrieve the relevant data from the user session data according to the links (definitions) to other tables (e.g., client-specific tables and global tables), as specified via the installation process. In this manner, certain detected events can be used to populate the dashboard(s) in a guide. For example, events with corresponding event IDs can be stored in a particular column of the user session table. Given that a placeholder field of a metric points to the particular column (which can be populated according to event type definitions provided in a client-specific event table), the data in the column can be used to generate the metric.

A. Detection of Events for a Selected Template

As described above, a client can interact with a selected template to provide corresponding data for placeholder fields that correspond to partially configured dashboards in the selected template. An illustrative example is shown in FIG. 11, where a client can select an item category and provide data relating to placeholders in each item category. For example, the client can select page groups and specify webpages that are part of a page group. As another example, the client can specify metrics that correspond with placeholders for a dashboard. Each placeholder field can include a corresponding description specifying details for the data to be associated with each placeholder. The client interaction with the selected template to provide data specific to each placeholder field can specify an event as described herein.

In some instances, a listing of metrics can be provided to the client. Each metric can include an aspect of the aggregated user session data configured to be tracked for a specific website. A list of available metrics can be provided to an installing user, e.g., as entities of a particular industry corresponding to the template may have a particular interest in a particular metric. The list of metrics can include: (1)

metrics that are currently available to the particular client performing the configuration (e.g., available only to the client or available to all clients), and/or (2) metrics that are not currently available but could be available. Additionally, a new template metric can be created, where a placeholder filed is specified along with other aspects of the metric, such as a specified type (e.g., aggregation or rate) and a function (e.g., sum or count).

For a metric to be available, any event types needed for the metric may first be defined. One or more event types can be identified that are needed as inputs for one or more placeholder fields for a selected template. For example, a metric can require tracking of one or more events, as counts or statistical values of the one or more events are used to determine a metric. A table can store which events are needed for which metrics, and another table can store which events are currently defined for a client, e.g., in a client-specific table.

A given metric in a template can define an aggregation type (sum, average, median, count, percentile, etc.) along with a placeholder field that the client can provide at install time. All of these placeholders can be presented to the client at install time, along with descriptions of each placeholder, so the client can identify what they need to choose from in a dataset to fill each placeholder.

If the event type(s) needed for a metric are not defined for the client, the metric can be displayed as part of the unavailable group. The distinction between available and not available can be made in various ways, e.g., by shading or placement into different parts of the screen. A user can select an unavailable metric to determine which event types still need to be defined. A user can select an undefined event type to provide the definition so that the system can detect such events and track them.

As an illustrative example, a dashboard can be built using a template tracking an impact of a promo code to transactions occurring on a website. A promo code usage metric can be created and assigned an aggregation type of COUNT and define that the client needs to provide an event that is triggered when a user provides a promo code during a user session. At install time, the client can be presented with a placeholder field with a description requesting an event that is triggered when a user attempts to use a promo code. After the client provides the event (e.g., by specifying a column that corresponds to an event type definition with a specified event ID in an event table), the promo code usage metric can be available as an aggregate metric, trended over time, compared for anomalies, and benchmarked against the number of promo code usages for other entities in a similar industry.

As noted above, an event can include an interaction or communication between a user device and a website. For example, for a dashboard configured to illustrate promo code performance, a metric can use data tracked for multiple events IDs, corresponding to different columns of a user session table. A first field (column as defined by an event type definition) of a user sessions table can correspond to a particular use of a promo code (e.g., where different attribute values correspond to different uses of the promo code). A second field can be for a discount amount, and a third field can be for revenues for the website. The logic defined for each field can retrieve the necessary information from user session data. As another example, a dashboard tracking a conversion rate can have respective fields for a total number of web sessions and a number of conversions. The data determined from tracking one or more events can be used as inputs to a field.

B. Populating Dashboards

After detecting the incidence of events in user session data and populating a user session table (i.e., data from users of the website), the dashboard can be populated using the data in the user session table to provide a visualization of an aspect of website performance. For example, a dashboard for a website conversion rate (example of a metric) can use a first field configured to track total web sessions (e.g., as specified via a first placeholder field) and a second field configured to track total conversions on the website (e.g., as specified via a second placeholder field) to determine the conversion rate.

Responsive to configuration of the placeholder fields for the dashboard as part of installing, user session data can be obtained from a user sessions table and processed to derive values for populating the dashboard. For example, the user session data can be processed to derive the total web sessions and total conversions during a time period. The derived data points can be processed using a formula/calculation specific to the dashboard to derive a time-based metric for the dashboard. For instance, the templates can include formulas for each metric that is visualized and analyzed within the collection of dashboards that make up that template. In the example of a template tracking promo code performance, the client only needs to provide events, pages, etc., that fill in variables that are part of formulas specific to the template in order to populate the dashboards for the template.

The dashboard can then be populated to visually represent the derived metric(s) over time to derive insights into website performance. For instance, dashboards for a selected template can be populated and displayed on a client device for review by a client.

Figure 13:
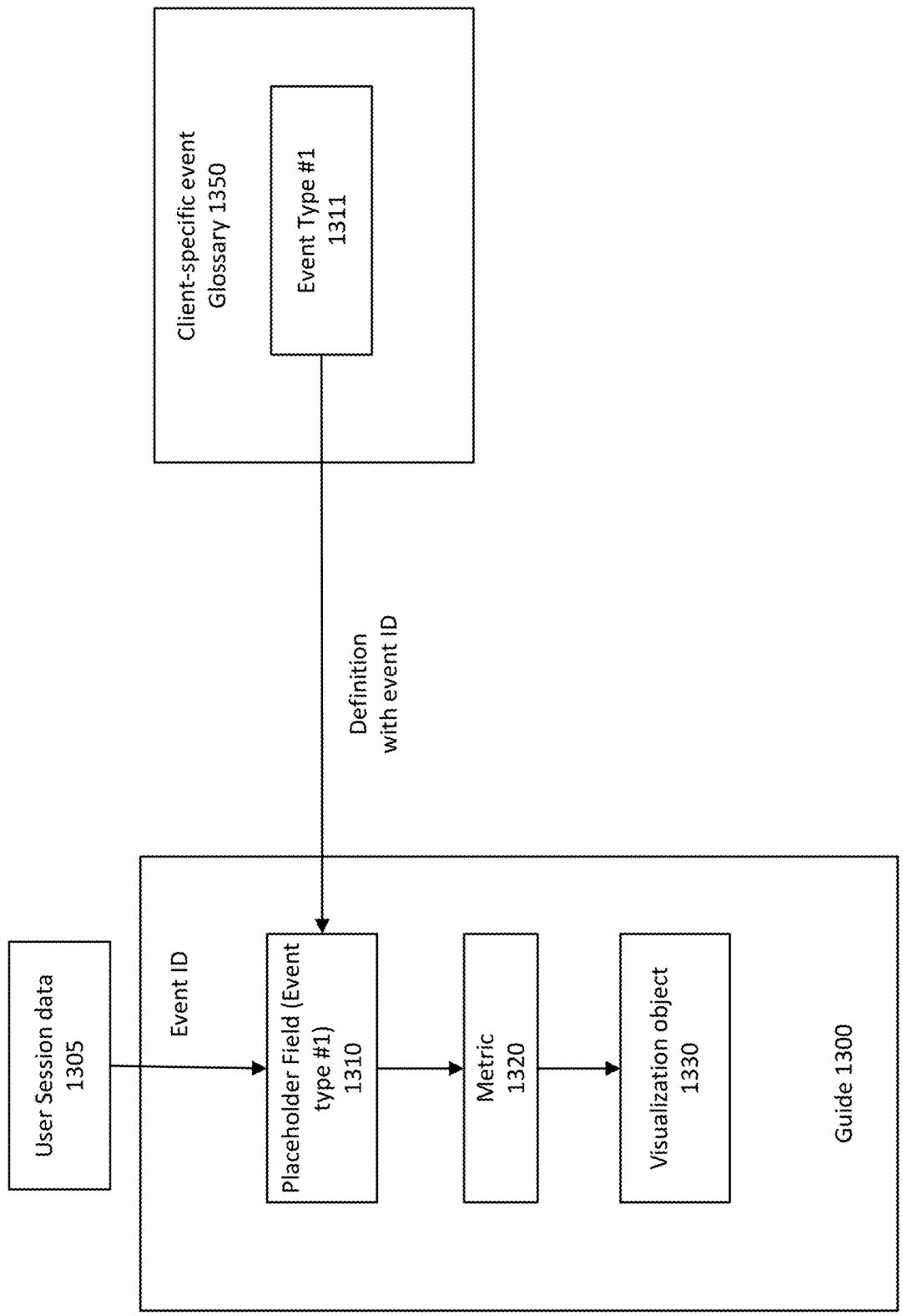
FIG. 13 is a schematic illustrating the generation of a metric for visualization using certain session data as defined by a placeholder field

FIG. 13 is a schematic illustrating the generation of a metric for visualization using certain session data as defined by a placeholder field. A guide 1300 is shown installed for a metric 1320, which includes a placeholder field that is linked to event type 1311 in a client-specific event glossary. The definition of event type 1311 can include an event ID for identifying the specific type of events that are to be tracked for determining metric 1320. User session data 1305 that has the corresponding event ID can be retrieved (e.g., via a query to a database) for calculating a value of the metric. Once calculated, the metric can be provided to a visualization object (e.g., a chart, map, funnel, table, etc.) that can display the metric pursuant to the specification in the guide template and in the install process.

Figure 14:
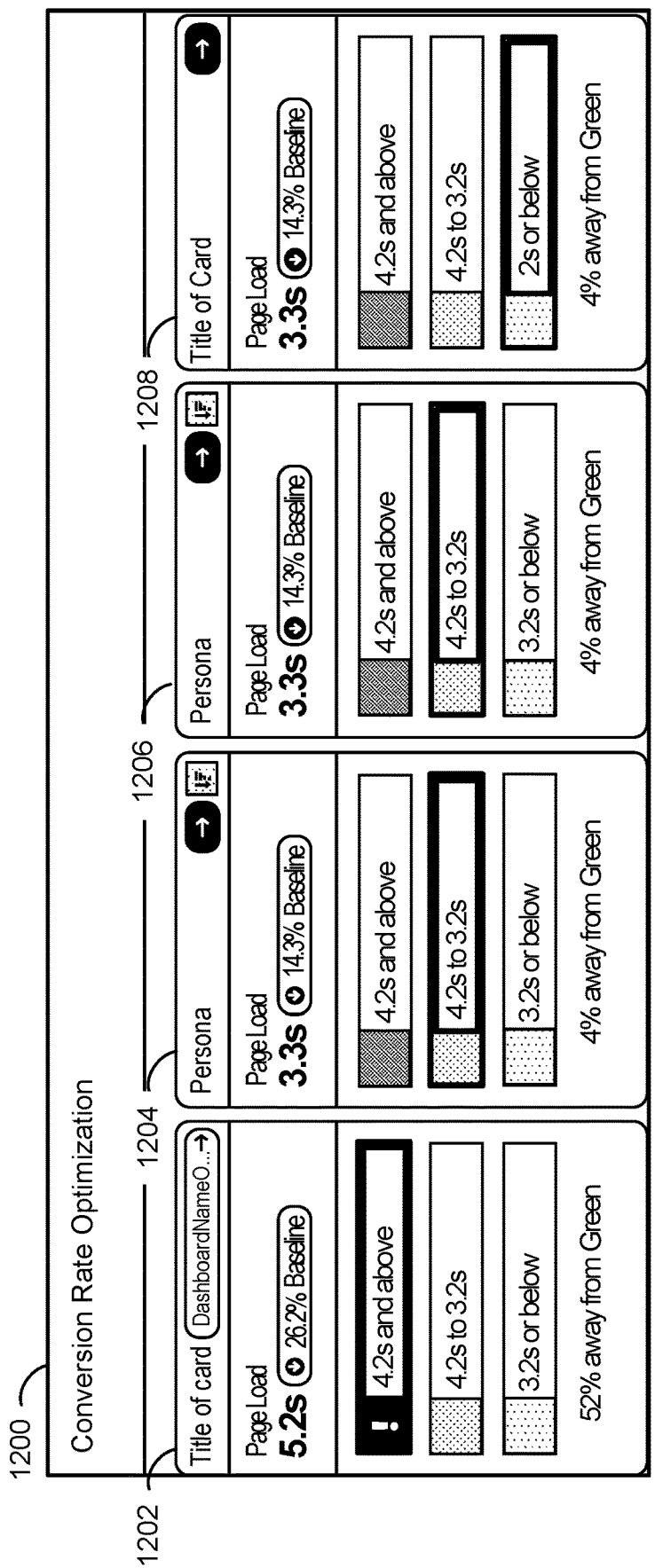
FIG. 14 illustrates an example screenshot of a dashboard, according to certain embodiments described herein.

FIG. 14 illustrates an example screenshot 1400 of a configured dashboard guide that has been installed. In the example as illustrated in FIG. 14, the dashboard guide can include a number of cards 1402, 1404, 1406, 1408. Each card can monitor a page load time (example of a metric) for a group of webpages (or segments of user sessions). For instance, a first card 1402 illustrates that a first page group has a page load time above a threshold number (e.g., 4.2 s and above). In this example, cards 1404, 1406 can include page groups that are within a range (e.g., between 4.2 s and 3.2 s). Further, card 1408 includes a page group with a page load time below a threshold level (e.g., 3.2 s or below). Cards 1402, 1404, 1406, and 1408 can be provided as part of a dashboard for the selected template.

V. Examples of Building and Installing Template Objects

As mentioned above, the creation of a guide template and installing of the template to obtain a working guide can involve creation of various object types, such as template events, template metrics, template segments, template dimensions, and template funnels. Thus, a client can provide definitions for events, template metrics, template dimensions, and template funnels. These object types can be stored in tables that are specific to a particular object and may be stored in tables that are client-specific. Such client A client-specific tables are also referred to as a client-specific glossary.

The glossary for each client can be stored in different locations, e.g., in different tables or a table that is portioned into different portions for different clients. Further, the templates and any global glossaries (e.g., a list of metrics available to all clients) can be stored in one location, while the installations (i.e., working guides) of those templates are stored in a second location. In that second location, the installed templates can be partitioned by client and specific team within that client.

The events, metrics, dimensions, and funnels can be defined and then reused. For example, a client specify to add a chart of a particular metric, e.g., by selecting a chart option and selecting a metric from a list or providing a definition of the metric. Once complete, a template object (e.g., a template metric) can be stored in a corresponding glossary, e.g., a client-specific glossary. Once stored, the template metric can be used in any template and installed guide for clients that have access to the template metric. A pointer to an object in a client-specific metric table can be placed in each guide template that uses a particular template metric. An installed metric can use the pointer to the object as well as additional information used to configure the metric for a working guide. In this manner, one can just change the template metric if a change is to occur for all uses of that metric across all guides.

A. Client-Specific Metric

A template metric can be created and stored in a template glossary, e.g., client-specific or global. A globally-available metric might be average page load time, which can use a global event type that does not need to be defined by each different website as it is captured for all. But a template metric can be defined specifically for a client and may use a client-defined event. Such client-specific metrics are described below.

1. Example for Defining a Template Metric

FIG. 15A shows an example interface for specifying a type of metric. FIG. 15B shows an example interface for specifying fields for a template metric. A metric can be specifically defined for a template or can be selected from a glossary of different metrics. The interface of FIG. 15B can be used at creation or install time of a template.

FIG. 15A shows two options for a type of metric, namely a rate type and an aggregate type. Depending on which type is selected, a different interface may be provided for selecting fields of the metric. The metric can also be labeled. The name of the template or any metadata can connect the metric to a particular context.

FIG. 15B shows a function field 1502 for providing a function for determining the metric. In the example shown, the metric has an aggregate type. The function is a count, which can provides a count of number of events of a particular type. Examples of a function for an aggregation type include average, count, distinct, maximum, median, minimum, sum, and percentile (e.g., 90 or 95). A rate type can determine a rate of one aggregate-type metric relative to a second aggregate-type metric, e.g., conversion rates or comparisons between two traffic segments.

A column field 1504 can be used to specify a column of a user session data table (also just called a user session table), where the particular column includes data for a particular event type. The event type can be defined in a client-specific event table, e.g., which can store an event ID that is captured by a captured agent.

A segment field 1506 allows a user to specify one or more attribute values for one or more attributes (e.g., user device type, browser type, operating system, etc.) that can be used to filter (segment) the user session data. An attribute can correspond to a column of the user session data table. The attribute values can be combined in any logical combination, as will be appreciated by the skilled person. As shown, there is no filtering since all users and all traffic is specified. If one or more attribute values were specified, then certain rows of a user session data table can be selected (e.g., via a where statement to a database) based on a matching value corresponding to the provided attribute value. For example, for a type of aggregation, a select statement can specify which column to select, and then a where statement (e.g., in SQL) can indicate the attribute value for the column (e.g., the browser column).

Any of these fields for a metric can be locked in for a template and are not configurable during the install process. Alternatively, any of these fields can correspond to a placeholder field that use a client-specific definition, e.g., for an event or dimension. For a template that allows configuring for a specific client, the column field 1504 can be configurable to allow selection of a client-defined column that uses a client-defined event. Examples for column field 1504 include email, user login, name, when first or last visited, visit number, page load time, conversion value, converted status, and session ID.

2. Installing a Metric

Figure 16:
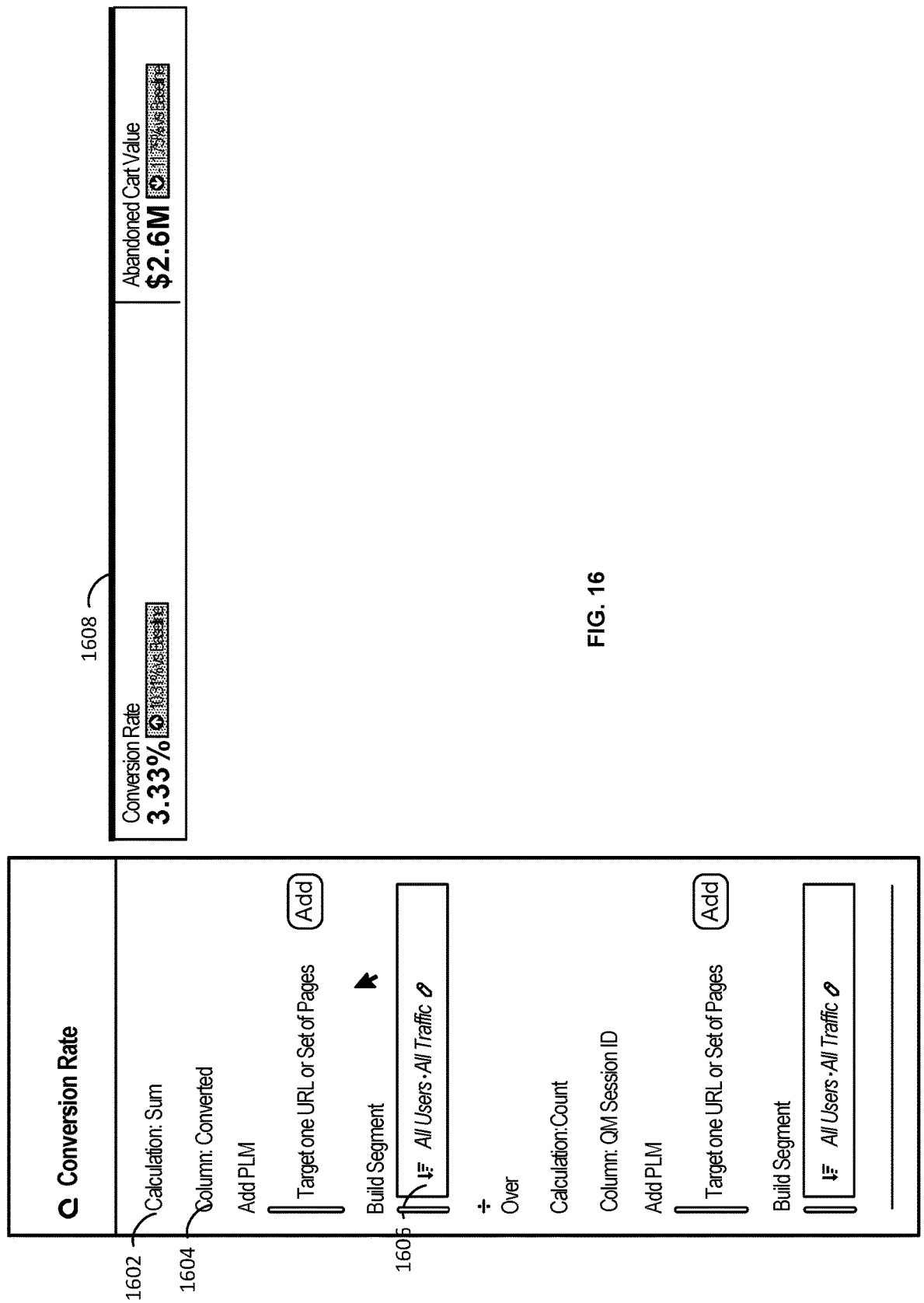
FIG. 16 shows an interface for installing a metric for a guide.

FIG. 16 shows an interface for installing a metric for a guide. Certain fields may be already locked at time of installation. As shown, function field 1602 and column field 1604 are locked. Column field 1604 corresponds to a global event that is tracked across multiple clients. For a client-specific column field, such a field would not be locked. Locking at this point on the template means there is less work for the installer, at least once a suitable template is selected. As shown, the installer can still provide a segment field 1606. A builder can add notes to guide an installer about selections for any open fields.

Once installed, the template can retrieve the specified data (e.g., as specified by column field 1604) and determiner the metric according to function field 1602, potentially after filtering the data according to segment field 1606. A visualization 1608 provides such a result.

3. Reuse of Metric Across Templates

Once created, a template metric can be stored in a client-specific glossary or a system-wide (global) glossary. Such template metrics can be selected for adding to a guide template and used within an installed guide.

Figure 17:
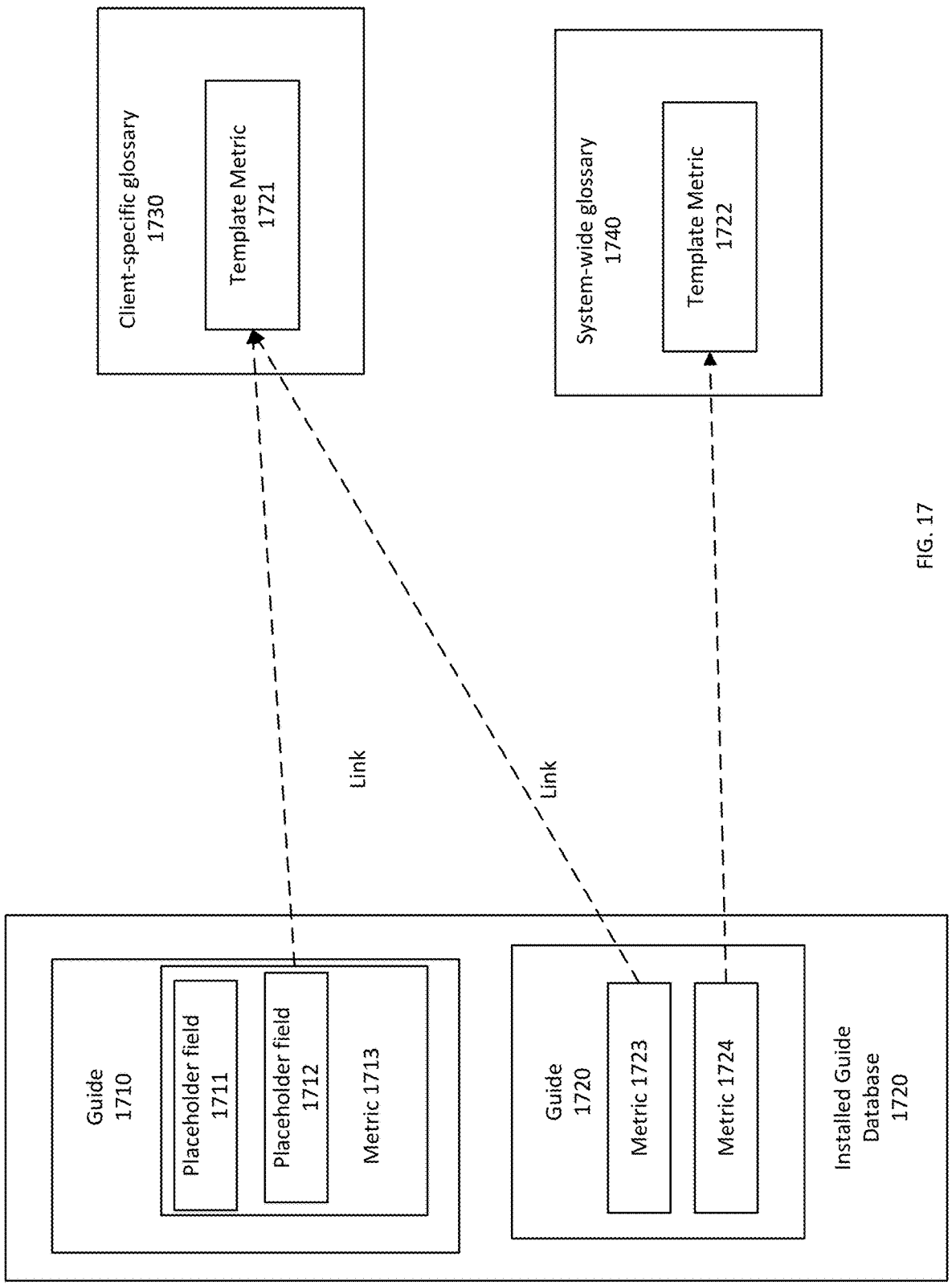
FIG. 17 shows a schematic illustrating a reuse of a template metric by linking to different guides.

FIG. 17 shows a schematic illustrating a reuse of a template metric by linking to different guides. An installed guide database includes a guide 1710 and a guide 1720. These two guides may be installed for a same client. Guides for different clients can be stored in different databases or in different partitions of a same database.

Guide 1710 includes a metric 1713, which includes a placeholder field 1711 and a placeholder field 1712. In other embodiments, metric 1713 may only include one placeholder field. Much like FIG. 8, where placeholder fields were linked to event glossaries, metric 1713 can be linked to template metric 1721 stored in client-specific glossary 1730.

Guide 1720 includes a metric 1723 and a metric 1724. Metric 1723 is also linked to template metric 1721. In this manner, metrics of two different guides can be linked to a same template metric. Any changes to template metric 1721 can propagate to any guide that has an installed metric that is linked to template metric 1721. Metric 1724 is linked to a template metric 1722, which is stored in a system-wide glossary 1740 (a global glossary). Template metric 1722 can be linked to guides installed for any client, given it can be accessed system-wide.

At the glossary level, template metric 1721 can have a template metric ID: 123. The template metric name can be stored. After install, at the client level, the installed metric ID can be 456. The installed metric event ID can be 789. Such an event ID can be stored in a placeholder field, e.g., placeholder field 1712. Metric 1713 can also store the original template metric ID (123) as a link back to template metric 1721. The original template metric ID keeps the installed metric related back to the original template it was created from.

In this manner, a defined template metric can be used in a chart and a table of two different guides. Use of links to the glossary allows reuse of the same object for both guides. A change to template metric 1721 for the client subscription changes it in all places, including metric 1723 and metric 1713, both of which could be configured slight different. For example, metric 1713 could have a display grouped by dimension, and metric 1723 might just have the value displayed once for all users in a table.

The link to the template metrics can use a metric identifier that corresponds to a particular template object in a glossary. The process of installing a guide defines items in the installed guide (e.g., stored in a client-specific repository), and in this case, a definition is a link to template metric 1721 along with any configurations, e.g., for segmentation or grouping by dimension. The installing can defines a connection between a guide and the template metric through an ID relationship. For example, a dashboard definition can indicate this metric is ID123. For visualization, the guide can fetch the template metric definition, and then retrieve (e.g., via a SQL query) the corresponding session data for the specified column field (e.g., subject to any segmentation), and then use the function field to determine the metric for one or more attribute values (e.g., for a segment or grouped by dimension). The visualization can depend on the type of visualization card, e.g., a chart, table, funnel, etc.

B. Client-Specific Events

As described above (e.g., for FIG. 8), client-specific events can be defined and stored in a client-specific glossary. The client-specific event can be associated with a particular event ID, which can be provided in user traffic from user devices. A particular event ID can indicate information to be tracked by the detection system and used to determine a value that is stored in a particular column of a user session table.

A capture agent for a particular website and include code that identifies a particular event (e.g., a transaction amount, a page being reached, a loyalty status of a profile, etc.). The code of the capture agent can send an event message (e.g., using a send event API) that includes the event ID. In this manner, the detection system can identify a specific event type, and use data in the event message to update a user session table. Each row of a user session table can correspond to a different user session, with column values populated using the event messages (and corresponding event IDs) received for that session.

C. Client-Specific Dimension

Besides client-specific events and metrics, a client can provide a client-specific dimension (also referred to as a template dimension).

Figure 18:
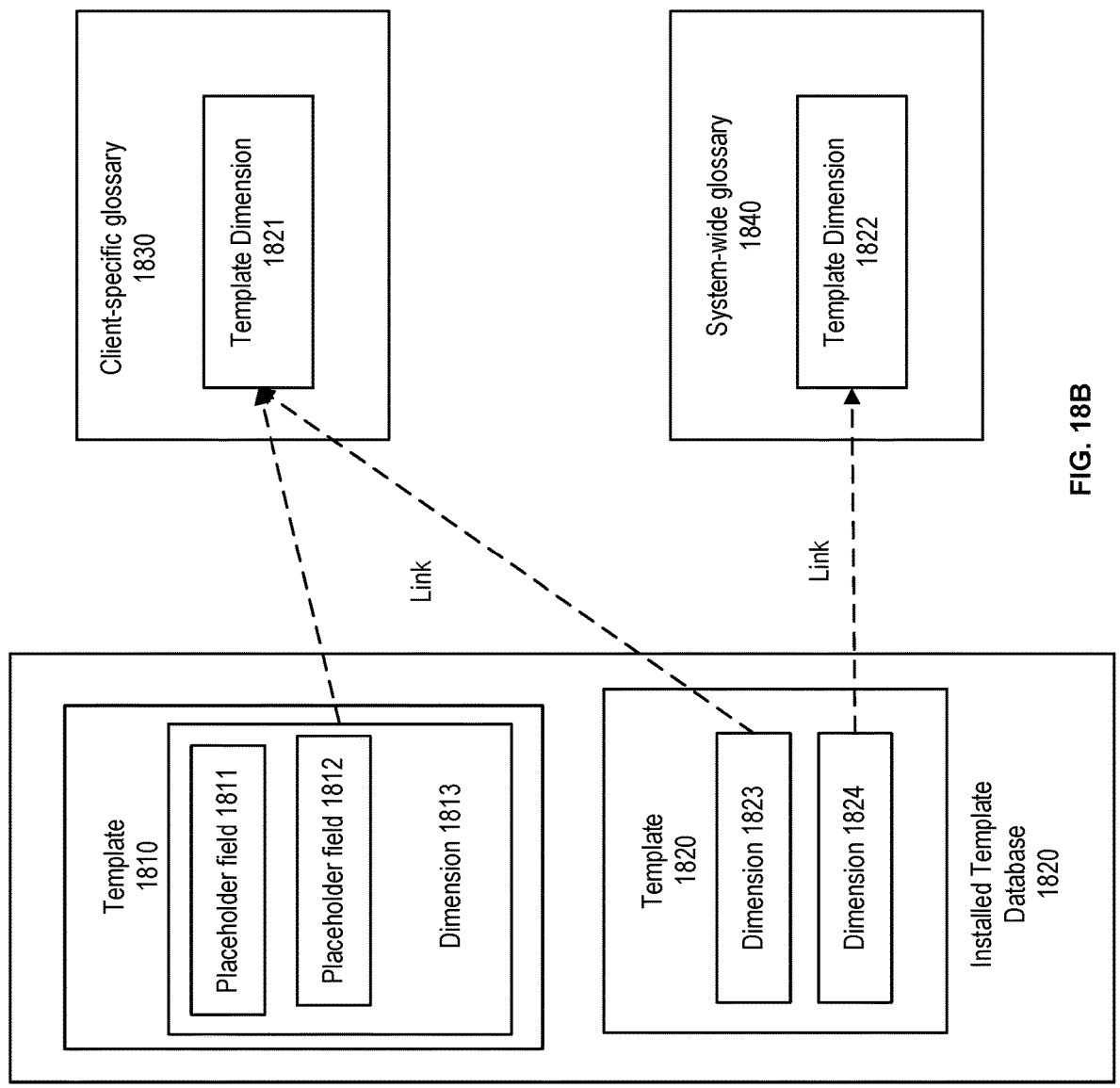
FIG. 18A shows a user interface for starting creation of a template dimension. A name and description can be provided.
FIG. 18B shows a schematic illustrating a reuse of a template dimension by linking to different guides.

FIG. 18A shows a user interface for starting creation of a template dimension. A name and description can be provided. Once created, a dimension ID can be assigned for storing the template dimension in a client-specific glossary. The template dimension itself can include a placeholder field that can link to a particular column of a user session table, where the column corresponds to a particular event type. The interface can further include a dropdown list used to select different attributes corresponding to different columns (and conversely an event type) of a user session table for use as template dimension. A client-specific event can be selected.

FIG. 18B shows a schematic illustrating a reuse of a template dimension by linking to different guides. FIG. 18B can be implemented in a similar manner as FIG. 17. An installed guide database includes a guide 1810 and a guide 1820. These two guides may be installed for a same client. Guides for different clients can be stored in different databases or in different partitions of a same database.

Guide 1810 includes a dimension 1813, which includes a placeholder field 1811 and a placeholder field 1812. Much like FIG. 8, where placeholder fields were linked to event glossaries, dimension 1813 can be linked to template dimension 1821 stored in client-specific glossary 1830. Guide 1810 can include a metric that is grouped by dimension 1813. Information about a column (and possibly corresponding attribute values) corresponding to dimension 1813 can be stored in template dimension 1821. Thus, template dimension 1821 can include a list of different possible values that the attribute and corresponding column may have.

Guide 1820 includes a dimension 1823 and a dimension 1824. Dimension 1823 is also linked to template dimension 1821. In this manner, dimensions used by two different guides can be linked to a same template dimension. Any changes to template dimension 1821 can propagate to any guide that has an installed dimension that is linked to template dimension 1821. Dimension 1824 is linked to a template dimension 1822, which is stored in a system-wide glossary 1840 (a global glossary). Template dimension 1822 can be linked to guides installed for any client, given it can be accessed system-wide. Examples of template dimension 1822 that are available system-wide can includes browser type. An example template dimension 1821 that is client-specific can include a loyalty level, which can correspond to a client-specific event.

At the glossary level, template dimension 1821 can have a template dimension ID: 123. As an example, the template dimension name can be Loyalty Level. After install, at the client level, the installed dimension ID can be 456. The installed dimension event ID can be 789. Such an event ID can be stored in a placeholder field, e.g., placeholder field 1812. Dimension 1813 can also store the original template dimension ID (123) as a link back to template dimension 1821. The original template dimension ID keeps the installed dimension related back to the original template it was created from.

D. Segmenting and Grouping by Dimension

Once an event is define and associated with a column of a user session table, a guide template or an installed guide can be filtered by segment (as specified by attribute value) or grouped by dimension such that a metric value is determined for each attribute value within an attribute category. An example segment using a client-specific dimension might be that loyalty level is gold.

The segmentation and/or the grouping by dimension can be implemented at the creation of the template (and locked at that time) or at install time so that the installer can determine. Allowing such segmentation and grouping at install time allows a generic template metric to be generated and shared among guides, but also allows a specific configuration to be established for a particular guide. In this manner, a visualization card can provide a specific segmentation of the metric. As an example, the template metric can be the rate of users reaching the last step of a purchase funnel, but the visualization card on an installed guide can show the rate for a particular browser type. In other implementations, the browser type can be specified in the template.

E. Funnel

Figure 19:
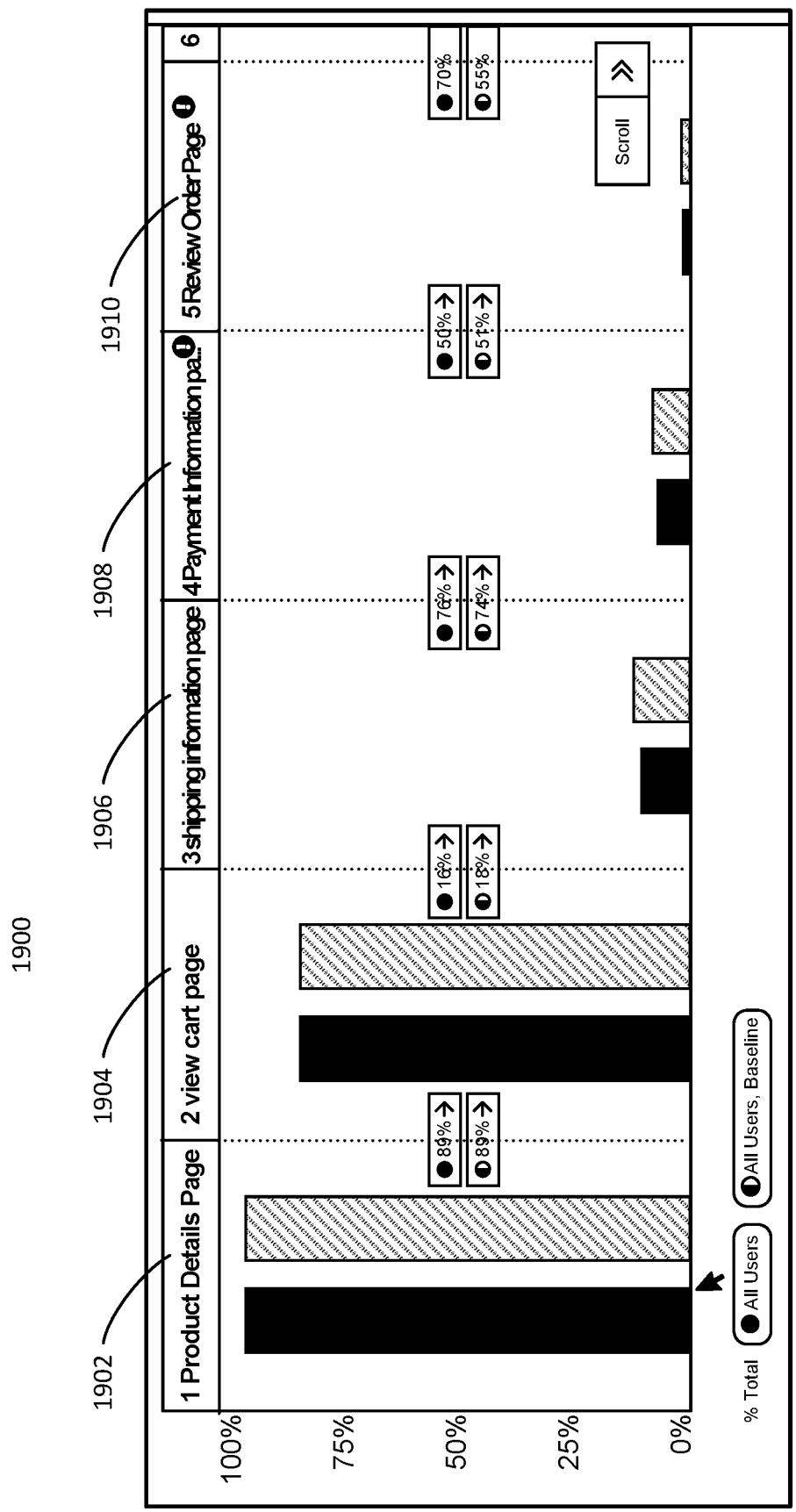
FIG. 19 shows an example funnel that can be used for a template funnel or an installed funnel.

FIG. 19 shows an example funnel 1900 that can be used for a template funnel or an installed funnel. Funnel 1900 has five pages that are ordered as part of a funnel. Each page corresponds to a different section in the bar chart. A products details page 1902 is shown first. A view cart page 1904 is second. A shipping information page 1906 is third. A payment information page is fourth. A review order page 1910 is fifth. Each of these pages can be a page group as described herein.

In funnel 1900, the metric is the number of sessions that reached the particular page. Each page (or page group) can be considered an event, where the vent indicates whether that page was reached in a session. A corresponding column can be a binary value indicating whether the page was reached. Thus, for each page of a funnel, a different event can be provided (e.g., column selected) when creating or installing a funnel. In one implementation, a user can drag and drop the different pages to changes the ordering. A page could be added or removed as well, e.g., by selecting deletion or add options. As another examples, the interface for building a funnel can have dropdown lists, e.g., as for a metric.

A funnel could be grouped by dimension as well, where different attribute values would be provided as different bars in a graph for a given page. As shown, two bars for a given page show all user and a baseline, which can correspond to different time periods. In such an example, the dimension can be time, and the two attribute values are different time ranges.

VI. Benchmarking

Benchmarking allows a comparison of a metric to a baseline. Certain metrics may be typical in a certain industry, and so those metrics could be averaged across an industry and used as a baseline. However, certain metrics may not be as important or applicable to a particular client. Further, a client may be focused on a particular segment, to which a comparison to a baseline is desired. The reuse of global template metrics across guide templates enables such benchmarking. Additionally, reuse of a same label for client-specific metrics can allow benchmarking for of that metric across clients. Alternatively, a system-wide label can be used to join metrics from different clients that are related by have different labels.

As described above, a metric in system-wide (global) global glossary can be used for various clients. Each guide that installs a template metric can be tracked. For example, the template metric can sore a guide ID for each guide that is linked to that template metric. A metric value for that metric can be retrieved from each guide (e.g., from an installed dashboard of an installed guide) that uses that metric and used to determine a benchmark for that metric. Each guide would determine the metric value against the client-specific session data. The glossary can store the IDs of the guides/dashboards that link to the template metric. The benchmark can be a statistical value (e.g., median, average, mean, etc.) determined from the metric values. The system can provide the statistical value back to the dashboards for displaying in a visualization card.

Each client could use a different event for a template metric but have a same label. Give that each of these client-specific template metrics has a same label, they can be analyzed collectively. In a similar manner as the global glossary, the system can track (e.g., storing guide or dashboards IDs) which guides/dashboards link to the client-specific template metrics that share the label. Metric values can be retrieved and used to determine a statistical value as a benchmark for the metric and send to the linked guides or dashboards.

Accordingly, a template metric can be stored in a glossary (system-wide or client-specific). For a client-specific glossary, different client-specific metrics with the same label can be stored in different client-specific glossaries. A plurality of dashboards installed for a plurality of clients can link to the template metric, e.g., in a global glossary or to different template metrics that share a label. The system can retrieve metric values from the plurality of dashboards and determine a statistical value from the metric values. The statistical value can be provided to the plurality of dashboards.

VII. Alerts

An installed guide can be associated with an alert of a metric. For example, a guide can include a metric of a number of user sessions for the website, possibly the number of sessions reaching a particular page. An installer can select a particular metric to set up for the alert. The particular metric can be treated as a key performance indicator (KPI) for that guide.

If the metric falls below a certain threshold (e.g., for a given time period), an alert can be generated. The alert can be sent via various communication channels, such as email, text messages, or chat messages to one or more client devices of a client subscription. The alert messages can include a link to the guide, so that a user can select the link and automatically have the associated guide be displayed. The guide can be automatically presented with the anomalous time period applied as a segmentation criteria. As another example, when the KPI deviates for a particular attribute value for a dimension, the guide can be displayed with a segmentation already applied using the particular attribute value, e.g., a particular loyalty level.

In some implementations, a template could have the KPI locked. But an installer can define the metric, e.g., by selecting a particular column associated with a particular event.

An interface listing a set of guides can include an indicator about whether a KPI has exceeded a threshold. The client could then select guides with an alert indicator and use those guides to determine a source of the network problem for the website. For example, a guide related to a page load time could have an indicator when the average page load time exceeds a threshold.

VIII. Flow Process for Building Dashboards for a Selected Template

Figure 20:
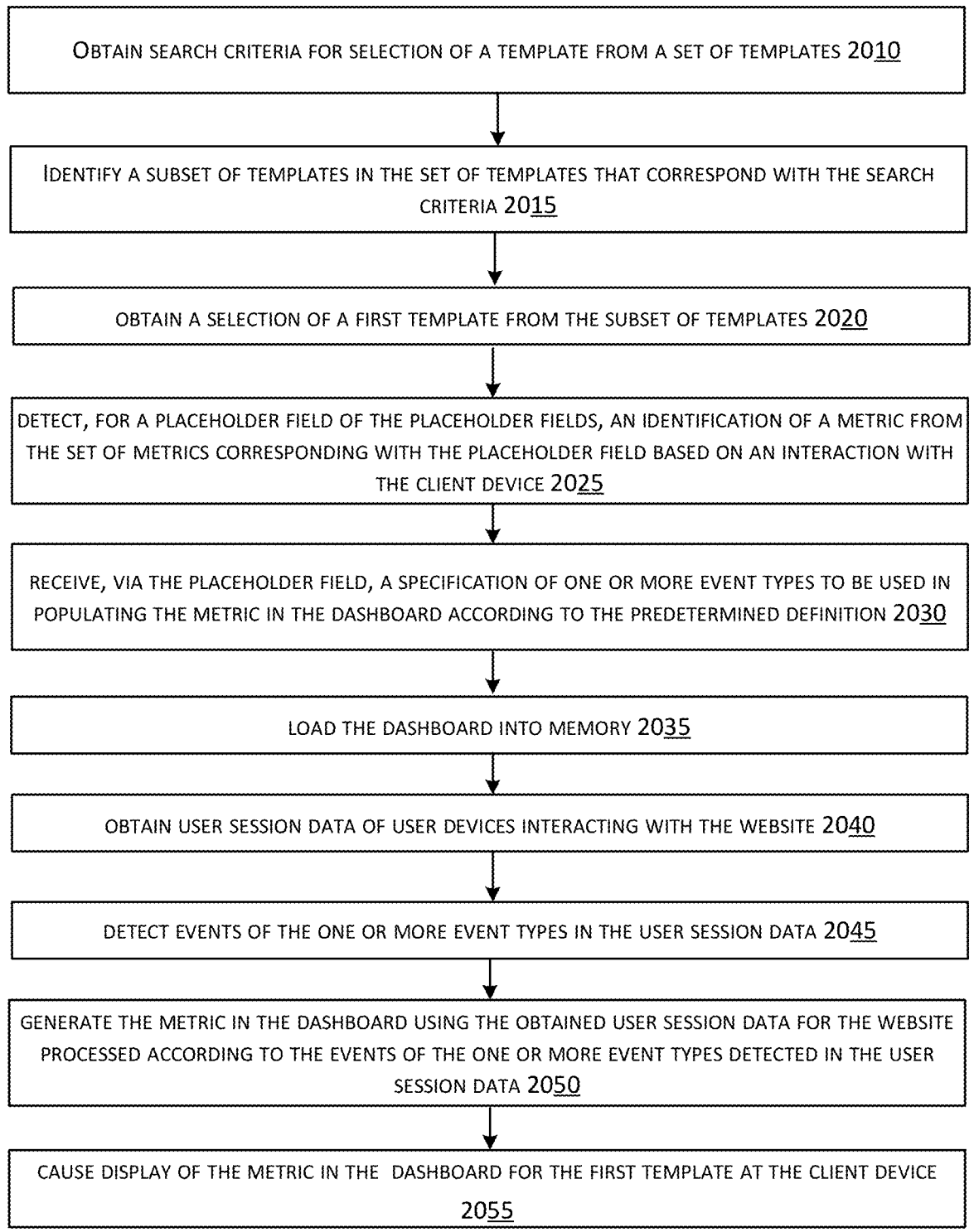
FIG. 20 is a flow diagram of an example process for building one or more dashboards for a selected template, according to certain embodiments described herein.

FIG. 20 is a flow diagram of an example process 2000 for building one or more dashboards for a selected template. A dashboard builder system (e.g., 140 as shown in FIG. 1) can interact with a client device (e.g., 150) and capture agent(s) (e.g., 130) to implement the process 2000 as described herein.

At 2010, the process can include obtaining search criteria for selection of a template included in a set of templates. For example, a client can provide keywords relating to an industry, use case, a desired output, or other context, relating to templates stored in a listing of the templates. For example, the client can provide search criteria specifying an industry relating to retail and e-commerce, and a use case relating to conversion rate optimization. In some instances, the search criteria can be compared with a table providing a description for each template. The search criteria can be specified using drop-down menus provided to a client device. The set of templates can store each template accessible to a client and a description for each template. Each template can provide one or more dashboards configured to visualize aggregated user session data for a website At 2015, the process can include identifying a subset of templates in the set of templates that correspond with the search criteria. For example, descriptions for each template can be compared with the search criteria to identify a subset of templates with descriptions matching the search criteria. Accordingly, the one or more search criteria can specify any of a context that corresponds with the website or a desired output from any template. The identifying of the subset of templates can include identifying, for each of the subset of templates, that terms for the one or more search criteria match terms provided in a description for each template of the subset of templates. The subset of templates can be provided to the client for selection by the client. The subset of templates can be arranged by any of a relevance of each template to the search criteria, a rating for each template, and/or a popularity of each template.

At 2020, a selection of a first template can be detected from the subset of templates. The first template including a dashboard. For instance, a client can select the first template from a subset of templates provided to the client with corresponding descriptions for each template. The first template can include a number of dashboards configured to provide insights into specific aspects of aggregated user session data. The first template can include a set of one or more metrics.

For a metric, each dashboard can include one or more corresponding placeholder fields providing inputs for specific data that, upon the processing of user session data, allow for population of the dashboards. The inputs can specify one or more events to populate the set of one or more metrics using user session data for the website. A screenshot (e.g., 600) of an example dashboard illustrating user sessions over time is illustrated in FIG. 6. For example, in the example in FIG. 6, the client can specify a metric that tracks user sessions for the website by interacting with placeholder field 606.

At 2025, an identification of a metric can be detected for a placeholder field. For example, a metric can be selected, and that metric has a placeholder field, such as a column field, function field, or a segment field can be selected for the metric, e.g., as described for FIG. 15B. The identified of the metric can be determined based on an interaction with the client device, e.g., a selection of a metric from a list. The interaction with the client device can includes a selection of a first column of a client-specific table, wherein the first column corresponds to a first event type of the one or more event types. The first event type can be a client-specific event type.

The metric includes a placeholder field of the one or more placeholder fields. The metric can be of a specified type (e.g., aggregate type or rate type) and having a specified function (e.g., for calculating the metric). The specified type for a metric can specify an aspect of website performance being tracked, and the specified function can specify how the metric is derived (e.g., a count, an average). Example metrics can track a number of concurrent user sessions with a website over a time duration or track page load times for a specific webpage.

The metric can correspond to a template metric object (e.g., described in FIG. 17) that is stored in a client-specific metric table (glossary). As described herein (e.g., for FIG. 17), the first template can store a pointer (e.g., a link or a metric identifier) to the template metric object for use in determining the metric based on the placeholder field. A definition of the metric (e.g., type and function) can be obtained, along with an indicator of the underlying data (e.g., as specified by the event types) to be retrieved from a user session database, for determining the metric.

At 2030, a specification of one or more event types to be used in populating the metric in the dashboard according to the specified function can be received via the placeholder field. As an example, the client can specify an event type to be used in populating a metric in a dashboard. Further, the placeholder field can be an interface where a client can provide a definition of the one or more events to be used for a metric. For example, the client can specify that a count of all user sessions for the website can be detected for specific time windows (e.g., every hour). As another example, a selection can be made from a list for a column field, function field, or a segment field can be selected for the metric, e.g., as described for FIG. 15B.

The one or more event types may be stored in a client-specific glossary (table) or a system-wide glossary, as is described herein. The specification of one or more event types can include an event ID that occurs in the user session data. The event ID can be specific to the client.

At 2035, the dashboard can be loaded into memory. Responsive to loading the dashboard into memory, metrics can be generated in the loaded dashboard using user session data for the website. The metrics can be generated based on the values specified for the one or more placeholder fields, e.g., which can identify the specific data that is to be retrieved. Such definitions of a metric can be reused by various guide templates and installed guides.

At 2040, user session data for user devices interacting with the website can be obtained. The user session data can provide details relating to the interactions of the user device with the website. For example, the user session data can be processed to identify webpages visited, page load times, a time spent on each web page, etc. Specific user data can be retrieved based on the event types specified in the placeholder field, as well values provided for other placeholder fields, e.g., a segment field. The values for the placeholder fields can select specific data in a database to be used for the specific installed dashboard.

At 2045, events of the one or more event types can be detected in the user session data. For instance, an event can include identifying an initiation of a user session or identifying that a user accessed a specific webpage. The events of the various event types can be detected and tracked according to metrics assigned to the dashboard. The events can be captured by capture agents, as described herein.

At 2050, the metric can be generated in the dashboard using the obtained user session data for the website processed according to the events of the one or more event types detected in the user session data. For instance, the generated metric in the dashboard can include a chart tracking concurrent user sessions detected in various time windows.

At 2055, the metric in the dashboard for the first template can be displayed at the client device. For example, the client, via client device, can view all dashboards that are part of the first template to visualize aspects of user session data and derive insights into the user session data.

The identified metric can further include a dimension placeholder field of the one or more placeholder fields. In such an example, a first dimension type can be received for a dimension placeholder field, where the first dimension type corresponds to a second column of a table (e.g., a client-specific table). The display of the metric can be grouped by values of the first dimension type as provided in the second column of the client-specific table.

The template can be created using a segment field, e.g., as described in section V.D. For example, selections of the specified type and specified function can be received from a list of predetermined types and functions. An attribute value of a column of a table (e.g., a client-specific table) that is populated using the user session data can be received. The attribute value can selects sessions of the client-specific table having the attribute value to be used in generating the metric.

For the segmentation, a page group can be used. Thus, the attribute value can be whether a session included a set of one or more specified pages of the website. The page group can be used to create a funnel, as described above. One or more additional attribute values can be received. Each additional attribute value can correspond to a particular set of one or more pages of the website. An order of the sets of pages Can be received to define the funnel such that the metric is respectively displayed for each set of pages according to the order.

As described in the section on alerts, responsive to detecting that the metric exceeded a threshold, an alert can be provided to a client device. The alert can provide a link to the dashboard.

As described in the section on benchmarking, a template metric can be stored in a glossary. A plurality of dashboards installed for a plurality of clients can link to the template metric, e.g., by storing a pointer, such an a metric ID that identifies the template metric in the glossary. Metric values can be retrieved from the plurality of dashboards, for determining a statistical value from the metric values. The statistical value can then be provided to the plurality of dashboards.

IX. Example Computer System

Figure 21:
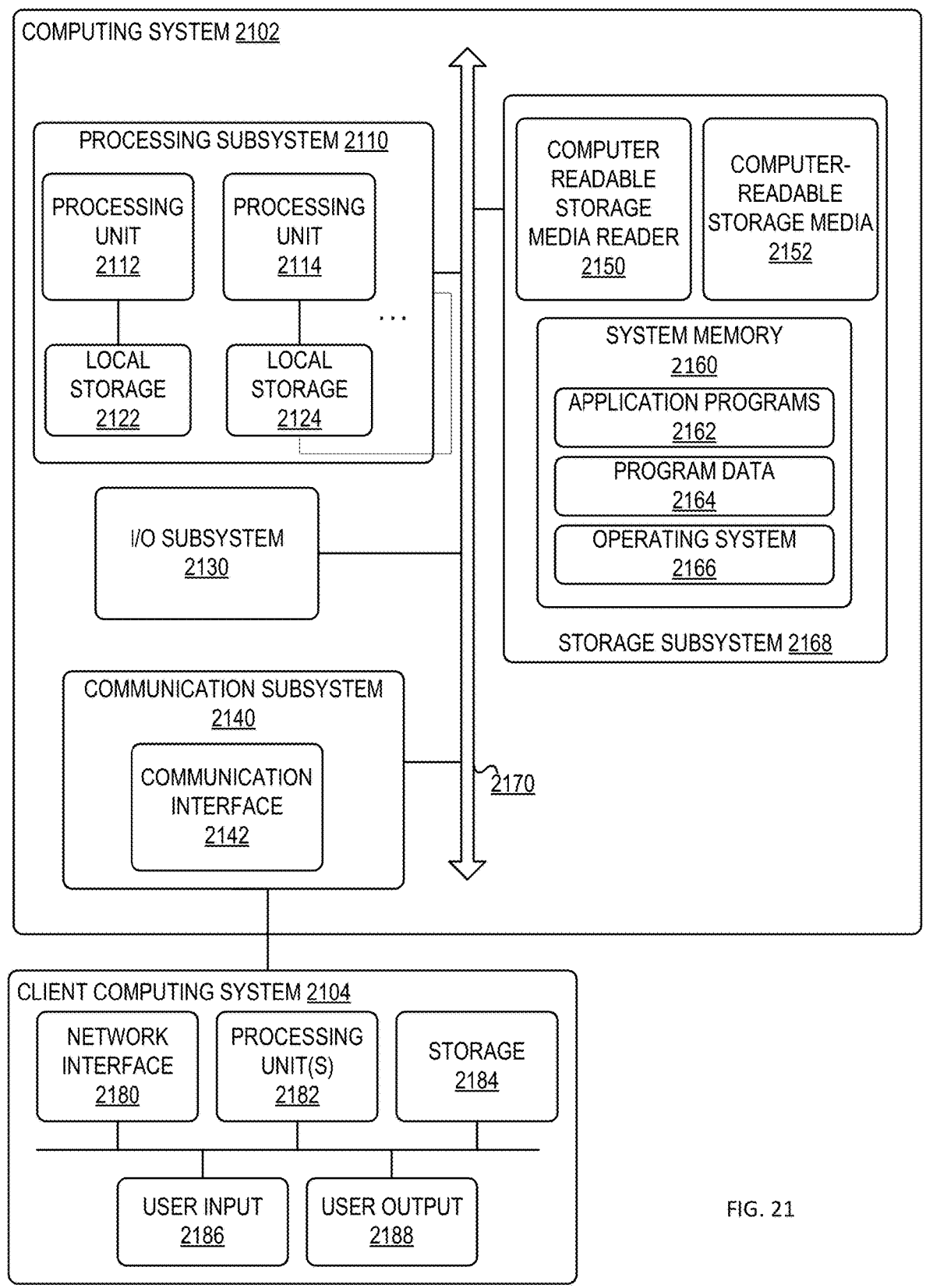
FIG. 21 illustrates an example of a computing system that may be used with certain embodiments described herein.

Various operations described herein may be implemented on computer systems, which may be of generally conventional design. FIG. 21 shows a simplified block diagram of a representative computing system 2102 and client computing system 2104 usable to implement certain embodiments of the present disclosure. In various embodiments, computing system 2102 or similar systems may implement capture management system, or any other computing system described herein or portions thereof.

Computing system 2102 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 2102 may include processing subsystem 2110. Processing subsystem 2110 may communicate with a number of peripheral systems via bus subsystem 2170. These peripheral systems may include I/O subsystem 2130, storage subsystem 2168, and communication subsystem 2140.

Bus subsystem 2170 provides a mechanism for letting the various components and subsystems of computing system 2102 communicate with each other as intended. Although bus subsystem 2170 is shown schematically as a single bus, alternative embodiments of the bus subsystem may utilize multiple buses. Bus subsystem 2170 may form a local area network that supports communication in processing subsystem 2110 and other components of server computing system 2120. Bus subsystem 2170 may be implemented using various technologies including server racks, hubs, routers, etc. Bus subsystem 2170 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 2130 may include devices and mechanisms for inputting information to computing system 2102 and/or for outputting information from or via computing system 2102. In general, use of the term "input device" is intended to include all possible types of devices and mechanisms for inputting information to computing system 2102. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 2102 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 2110 controls the operation of computing system 2102 and may comprise one or more processing units 2112, 2114, etc. A processing unit may include one or more processors, including single core processor or multicore processors, one or more cores of processors, or combinations thereof. In some embodiments, processing subsystem 2110 may include one or more special purpose co-processors such as graphics processors, digital signal processors (DSPs), or the like. In some embodiments, some or all of the processing units of processing subsystem 2110 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 2122, 2124. Any type of processors in any combination may be included in processing unit(s) 2112, 2114.

In some embodiments, processing subsystem 2110 may be implemented in a modular design that incorporates any number of modules (e.g., blades in a blade server implementation). Each module may include processing unit(s) and local storage. For example, processing subsystem 2110 may include processing unit 2112 and corresponding local storage 2122, and processing unit 2114 and corresponding local storage 2124.

Local storage 2122, 2124 may include volatile storage media (e.g., conventional DRAM, SRAM, SDRAM, or the like) and/or non-volatile storage media (e.g., magnetic or optical disk, flash memory, or the like). Storage media incorporated in local storage 2122, 2124 may be fixed, removable or upgradeable as desired. Local storage 2122, 2124 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 2112, 2114 need at runtime. The ROM may store static data and instructions that are needed by processing unit(s) 2112, 2114. The permanent storage device may be a non-volatile read-and-write memory device that may store instructions and data even when a module including one or more processing units 2112, 2114 and local storage 2122, 2124 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 2122, 2124 may store one or more software programs to be executed by processing unit(s) 2112, 2114, such as an operating system and/or programs implementing various server functions such as functions of capture management system, or any other server(s) associated with capture management system. "Software" refers generally to sequences of instructions that, when executed by processing unit(s) 2112, 2114 cause computing system 2102 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 2112, 2114. In some embodiments the instructions may be stored by storage subsystem 2168 (e.g., computer readable storage media). In various embodiments, the processing units may execute a variety of programs or code instructions and may maintain multiple concurrently executing programs or processes. At any given time, some or all of the program code to be executed may be resident in local storage 2122, 2124 and/or in storage subsystem including potentially on one or more storage devices. Software may be implemented as a single program or a collection of separate programs or program modules that interact as desired. From local storage 2122, 2124 (or non-local storage described below), processing unit(s) 2112, 2114 may retrieve program instructions to execute and data to process in order to execute various operations described above.

Storage subsystem 2168 provides a repository or data store for storing information that is used by computing system 2102. Storage subsystem 2168 provides a tangible non-transitory computer-readable storage medium for storing the basic programming and data constructs that provide the functionality of some embodiments. Software (programs, code modules, instructions) that when executed by processing subsystem 2110 provide the functionality described above may be stored in storage subsystem 2168. The software may be executed by one or more processing units of processing subsystem 2110. Storage subsystem 2168 may also provide a repository for storing data used in accordance with the present disclosure.

Storage subsystem 2168 may include one or more non-transitory memory devices, including volatile and non-volatile memory devices. As shown in FIG. 21, storage subsystem 2168 includes a system memory 2160 and a computer-readable storage media 2152. System memory 2160 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 2102, such as during start-up, may typically be stored in the ROM. The RAM typically contains data and/or program modules that are presently being operated and executed by processing subsystem 2110. In some implementations, system memory 2160 may include multiple different types of memory, such as static random access memory (SRAM) or dynamic random access memory (DRAM). Storage subsystem 2168 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 2168.

By way of example, and not limitation, as depicted in FIG. 21, system memory 2160 may store application programs 2162, which may include client applications, Web browsers, mid-tier applications, relational database management systems (RDBMS), etc., program data 2164, and one or more operating systems 2166. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2152 may store programming and data constructs that provide the functionality of some embodiments. Software (programs, code modules, instructions) that when executed by processing subsystem 2110 a processor provide the functionality described above may be stored in storage subsystem 2168. By way of example, computer-readable storage media 2152 may include non-volatile memory such as a hard disk drive, a magnetic disk drive, an optical disk drive such as a CD ROM, DVD, a Blu-Ray® disk, or other optical media. Computer-readable storage media 2152 may include, but is not limited to, Zip® drives, flash memory cards, universal serial bus (USB) flash drives, secure digital (SD) cards, DVD disks, digital video tape, and the like. Computer-readable storage media 2152 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs. Computer-readable storage media 2152 may provide storage of computer-readable instructions, data structures, program modules, and other data for computing system 2102.

In certain embodiments, storage subsystem 2168 may also include a computer-readable storage media reader 2150 that may further be connected to computer-readable storage media 2152. Together and, optionally, in combination with system memory 2160, computer-readable storage media 2152 may comprehensively represent remote, local, fixed, and/or removable storage devices plus storage media for storing computer-readable information.

In certain embodiments, computing system 2102 may provide support for executing one or more virtual machines. Computing system 2102 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 2102. Accordingly, multiple operating systems may potentially be run concurrently by computing system 2102. Each virtual machine generally runs independently of the other virtual machines.

Communication subsystem 2140 provides an interface to other computer systems and networks. Communication subsystem 2140 serves as an interface for receiving data from and transmitting data to other systems from computing system 2102. For example, communication subsystem 2140 may enable computing system 2102 to establish a communication channel to one or more client computing devices via the Internet for receiving and sending information from and to the client computing devices. A client and a server can each include multiple systems, subsystems, or components. In various embodiments, methods may involve various numbers of clients and/or servers, including at least 10, 20, 50, 100, 200, 500, 1,000, or 10,000 devices. Methods can include various numbers of communications between devices, including at least 100, 200, 500, 1,000, 10,000, 50,000, 100,000, 500,00, or one million communications. Such communications can involve at least 1 MB, 10 MB, 100 MB, 1 GB, 10 GB, or 100 GB of data.

Communication subsystem 2140 may support both wired and/or wireless communication protocols. For example, in certain embodiments, communication subsystem 2140 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1402.11 family standards, or other mobile communication technologies, or any combination thereof), global positioning system (GPS) receiver components, and/or other components. In some embodiments, communication subsystem 2140 may provide wired network connectivity (e.g., Ethernet) in addition to or instead of a wireless interface.

Communication subsystem 2140 may receive and transmit data in various forms. For example, in some embodiments, communication subsystem 2140 may receive input communication in the form of structured and/or unstructured data feeds, event streams, event updates, and the like. For example, communication subsystem 2140 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 2140 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 2140 may also be configured to output the structured and/or unstructured data feeds, event streams, event updates, and the like to one or more databases that may be in communication with one or more streaming data source computers coupled to computing system 2102.

Communication subsystem 2140 may provide a communication interface 2142, e.g., a WAN interface, which may provide data communication capability between the local area network (bus subsystem 2170) and a larger network, such as the Internet. Conventional or other communications technologies may be used, including wired (e.g., Ethernet, IEEE 1402.3 standards) and/or wireless technologies (e.g., Wi-Fi, IEEE 1402.11 standards).

Computing system 2102 may operate in response to requests received via communication interface 2142. Further, in some embodiments, communication interface 2142 may connect computing systems 2102 to each other, providing scalable systems capable of managing high volumes of activity. Conventional or other techniques for managing server systems and server farms (collections of server systems that cooperate) may be used, including dynamic resource allocation and reallocation.

Computing system 2102 may interact with various user-owned or user-operated devices via a wide-area network such as the Internet. An example of a user-operated device is shown in FIG. 21 as client computing system 2104. Client computing system 2104 may be implemented, for example, as a consumer device such as a smart phone, other mobile phone, tablet computer, wearable computing device (e.g., smart watch, eyeglasses), desktop computer, laptop computer, and so on.

For example, client computing system 2104 may communicate with computing system 2102 via communication interface 2142. Client computing system 2104 may include conventional computer components such as processing unit(s) 2182, storage device 2184, network interface 2180, user input device 2186, and user output device 2188. Client computing system 2104 may be a computing device implemented in a variety of form factors, such as a desktop computer, laptop computer, tablet computer, smart phone, other mobile computing device, wearable computing device, or the like.

Processing unit(s) 2182 and storage device 2184 may be similar to processing unit(s) 2112, 2114 and local storage 2122, 2124 described above. Suitable devices may be selected based on the demands to be placed on client computing system 2104; for example, client computing system 2104 may be implemented as a "thin" client with limited processing capability or as a high-powered computing device. Client computing system 2104 may be provisioned with program code executable by processing unit(s) 2182 to enable various interactions with computing system 2102 of a message management service such as accessing messages, performing actions on messages, and other interactions described above. Some client computing systems 2104 may also interact with a messaging service independently of the message management service.

Network interface 2180 may provide a connection to a wide area network (e.g., the Internet) to which communication interface 2142 of computing system 2102 is also connected. In various embodiments, network interface 2180 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 2186 may include any device (or devices) via which a user may provide signals to client computing system; client computing system may interpret the signals as indicative of particular user requests or information. In various embodiments, user input device 2186 may include any or all of a keyboard, touch pad, touch screen, mouse or other pointing device, scroll wheel, click wheel, dial, button, switch, keypad, microphone, and so on.

User output device 2188 may include any device via which client computing system may provide information to a user. For example, user output device 2188 may include a display to display images generated by or delivered to client computing system 2104. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 2188 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2112, 2114 and 2182 may provide various functionality for computing system 2102 and client computing system, including any of the functionality described herein as being performed by a server or client, or other functionality associated with message management services.

It will be appreciated that computing system 2102 and client computing system 2104 are illustrative and that variations and modifications are possible. Computer systems used in connection with embodiments of the present disclosure may have other capabilities not specifically described here. Further, while computing system 2102 and client computing system 1204 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. embodiments of the present disclosure may be realized in a variety of apparatus including electronic devices implemented using any combination of circuitry and software.

While this disclosure has been described with respect to specific embodiments, one skilled in the art will recognize that numerous modifications are possible. For instance, although specific processes are described with reference to FIG. 1, other processes may be implemented. Embodiments of this disclosure may be realized using a variety of computer systems and communication technologies including but not limited to specific examples described herein.

In the detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method comprising performing, by a server:
    obtaining, from a client device associated with a client, one or more search criteria for selecting a template from a set of templates, the one or more search criteria containing at least one keyword related to the set of templates, each template of the set of templates providing one or more dashboards configured to visualize aggregated user session data for a website;
    identifying a subset of one or more templates from the set of templates that correspond with contextual information of the one or more search criteria;
    obtaining a selection of a first template from the subset of one or more templates, the first template including a dashboard, wherein the first template includes a set of one or more metrics, the first template including one or more placeholder fields comprising inputs for receiving a specification of event types of events to populate the set of one or more metrics by correlating the received event types with event types detected in user session data for the website;
    detecting an identification of a metric from the set of one or more metrics based on an interaction with the client device, wherein the metric includes a placeholder field of the one or more placeholder fields, the placeholder field including an input, and wherein the metric has a specified type and is determined using a specified function;
    receiving, via the input of the placeholder field, a specification of one or more event types to be used in populating the metric in the dashboard according to the specified function;
    loading the dashboard into a memory of the server;
    obtaining the user session data of user devices interacting with the website, the user session data including captured data for captured user interactions of the user devices with the website;
    detecting user events of the one or more event types in the user session data based on the specification received via the input of the placeholder field;
    generating the metric in the dashboard for the website using the obtained user session data processed according to the user events of the one or more event types detected in the user session data; and
    causing display of the metric in the dashboard at the client device.

2. The method of claim 1, wherein the metric corresponds to a template metric object that is stored in a client-specific metric table, and wherein the first template stores a pointer to the template metric object for use in determining the metric based on the placeholder field.

3. The method of claim 1, wherein the placeholder field is one of a function field, a column field, or a segment field.

4. The method of claim 1, wherein the interaction with the client device includes a selection of a first column of a client-specific table, wherein the first column corresponds to a first event type of the one or more event types, the first event type being a client-specific event type.

5. The method of claim 4, wherein the metric includes a dimension placeholder field of the one or more placeholder fields, the method comprising:
    receiving a first dimension type for the dimension placeholder field, the first dimension type corresponding to a second column of the client-specific table, wherein the display of the metric is grouped by values of the first dimension type as provided in the second column of the client-specific table.

6. The method of claim 4, further comprising creating the first template, the creating including:
    receiving selections of the specified type and the specified function from a list of predetermined types and functions; and
    receiving an attribute value of a column of the client-specific table that is populated using the user session data, wherein the attribute value selects sessions of the client-specific table having the attribute value to be used in generating the metric.

7. The method of claim 6, wherein the attribute value is whether a user session included a set of one or more specified pages of the website.

8. The method of claim 7, further comprising:
    receiving one or more additional attribute values, each corresponding to a set of one or more pages of the website; and
    receiving an order of the sets of one or more pages, wherein the metric is respectively displayed for each set of one or more pages according to the order.

9. The method of claim 1, wherein the specified type is selected from an aggregate or a rate, and wherein the specified function is selected from a list of functions for determining the aggregate or the rate.

10. The method of claim 1, wherein the specification of one or more event types includes an event ID that occurs in the user session data, and wherein the event ID is specific to the client.

11. The method of claim 1, wherein the events are detected using capture agents executing on user devices.

12. The method of claim 1, further comprising:
    providing an alert responsive to detecting that the metric exceeded a threshold, wherein the alert provides a link to the dashboard.

13. The method of claim 1, wherein the one or more search criteria specify any of a context that corresponds with the website or a desired output from any template, and wherein the identifying of the subset of one or more templates includes:
    identifying, for each of the subset of one or more templates, that terms for the one or more search criteria match terms provided in a description for each template of the subset of one or more templates.

14. The method of claim 1, wherein the subset of one or more templates includes is a subset of templates, the method further comprising
    causing display of the subset of templates to the client device, wherein each template of the subset of templates include a corresponding description describing each template.

15. The method of claim 1, further comprising:
    storing a template metric in a glossary, wherein a plurality of dashboards installed for a plurality of clients link to the template metric;
    retrieving metric values from the plurality of dashboards;
    determining a statistical value from the metric values; and
    providing the statistical value to the plurality of dashboards.

16. A computer product comprising a non-transitory computer readable medium storing a plurality of instructions that, when executed, control a computer system to perform a method including:
  obtaining, from a client device associated with a client, one or more search criteria for selecting a template from a set of templates, the one or more search criteria containing at least one keyword related to the set of templates, each template of the set of templates providing one or more dashboards configured to visualize aggregated user session data for a website;
  identifying a subset of one or more templates from the set of templates that correspond with contextual information of the one or more search criteria;
  obtaining a selection of a first template from the subset of one or more templates, the first template including a dashboard, wherein the first template includes a set of one or more metrics, the first template including one or more placeholder fields comprising inputs for receiving a specification of event types of events to populate the set of one or more metrics by correlating the received event types with event types detected in user session data for the website;
  detecting an identification of a metric from the set of one or more metrics based on an interaction with the client device, wherein the metric includes a placeholder field of the one or more placeholder fields, the placeholder field including an input, and wherein the metric has a specified type and is determined using a specified function;
  receiving, via the input of the placeholder field, a specification of one or more event types to be used in populating the metric in the dashboard according to the specified function;
  loading the dashboard into a memory of the computer system;
  obtaining the user session data of user devices interacting with the website, the user session data including captured data for captured user interactions of the user devices with the website;
  detecting user events of the one or more event types in the user session data; based on the specification received via the input of the placeholder field;
  generating the metric in the dashboard for the website using the obtained user session data processed according to the user events of the one or more event types detected in the user session data; and
  causing display of the metric in the dashboard at the client device.

17. The computer product of claim 16, wherein the metric corresponds to a template metric object that is stored in a client-specific metric table, wherein the first template stores a pointer to the template metric object for use in determining the metric based on the placeholder field, wherein the specification of one or more event types includes an event ID that occurs in the user session data, and wherein the event ID is specific to the client.

18. The computer product of claim 16, wherein the interaction with the client device includes a selection of a first column of a client-specific table, wherein the first column corresponds to a first event type of the one or more event types, the first event type being a client-specific event type.

19. The computer product of claim 18, wherein the metric includes a dimension placeholder field of the one or more placeholder fields, and the method further includes:
  receiving a first dimension type for the dimension placeholder field, the first dimension type corresponding to a second column of the client-specific table, wherein the display of the metric is grouped by values of the first dimension type as provided in the second column of the client-specific table.

20. The computer product of claim 18, wherein the method further includes creating the first template, the creating including:
  receiving selections of the specified type and the specified function from a list of predetermined types and functions; and
  receiving an attribute value of a column of the client-specific table that is populated using the user session data, wherein the attribute value selects sessions of the client-specific table having the attribute value to be used in generating the metric.

* * * * *